US012702232B2

(12) United States Patent
Beedham et al.

(10) Patent No.: US 12,702,232 B2
(45) Date of Patent: Aug. 11, 2026

(54) ARTICLE OF FURNITURE

(71) Applicant: Naught One Ltd, Knaresborough (GB)

(72) Inventors: James Beedham, Harrogate (GB); Adam Yates, Newcastle upon Tyne (GB)

(73) Assignee: Naught One Ltd., Knarlesborough (GB)

(*) Notice: Subject to any disclaimer, the term of this patent is extended or adjusted under 35 U.S.C. 154(b) by 149 days.

(21) Appl. No.: 18/672,997

(22) Filed: May 23, 2024

(65) Prior Publication Data

US 2024/0389753 A1 Nov. 28, 2024

Related U.S. Application Data

(60) Provisional application No. 63/503,863, filed on May 23, 2023.

(51) Int. Cl.
*A47C 7/00* (2006.01)
*B60B 33/06* (2006.01)

(52) U.S. Cl.
CPC ............ *A47C 7/006* (2013.01); *B60B 33/066* (2013.01)

(58) Field of Classification Search
CPC .............................. A47C 4/021; B60B 33/066
USPC ......... 297/217.1, 463.1, 218.1, 271.2, 271.3, 297/271.4, 440.13, 440.1; 248/129
See application file for complete search history.

(56) References Cited

U.S. PATENT DOCUMENTS 2,543,875 A * 3/1951 Silverman .............. A47C 4/021 297/440.13
2,613,389 A * 10/1952 Cramer .................. B60B 33/06 182/194
2,707,514 A * 5/1955 Smith .................... A47C 5/005 297/440.13
D211,169 S 5/1968 Dwyer
3,407,001 A * 10/1968 Minsker .................. A47C 4/03 297/440.13

(Continued)

FOREIGN PATENT DOCUMENTS

AT 53556-0001 8/2003
CN 3158790 9/2000

(Continued)

OTHER PUBLICATIONS

Edward Tenner, “How the Chair Conquered The World,” WQ Spring, 1997,21: 64-70.

(Continued)

*Primary Examiner* — Jose V Chen

(74) *Attorney, Agent, or Firm* — Michael Best & Friedrich LLP

(57) ABSTRACT

An article of furniture includes a foam base, a rigid frame, and a padded support. The foam base includes a foam seat, a foam back extending from the foam seat, and a slot extending along the foam seat. The rigid frame includes a frame seat, a frame back, and a projection. The frame seat is configured to engage the foam seat. The frame back is configured to engage the foam back. The projection is configured to be received in the slot. The padded support includes a padded seat, a padded back, or both. The padded support is disposed on a side of the rigid frame opposite the foam base. The padded seat is configured to engage the frame seat. The padded back is configured to engage the frame back.

20 Claims, 23 Drawing Sheets

(56) References Cited

U.S. PATENT DOCUMENTS

| | | | | | |
|---|---|---|---|---|---|
| 3,574,400 | A | | 4/1971 | Day | |
| 3,637,256 | A | | 1/1972 | Fillmore | |
| D225,933 | S | | 1/1973 | Duern et al. | |
| 3,893,731 | A | | 7/1975 | Maggs | |
| 3,944,280 | A | | 3/1976 | Keeler | |
| 3,967,852 | A | | 7/1976 | Eiselt et al. | |
| 3,973,281 | A | * | 8/1976 | Davis | A47C 27/15 297/440.13 |
| 4,092,049 | A | | 5/1978 | Schoblom | |
| 4,109,960 | A | | 8/1978 | Stinchfield | |
| D275,243 | S | | 8/1984 | Tiffany, III | |
| D277,432 | S | | 2/1985 | Appel et al. | |
| D289,467 | S | | 4/1987 | Pickett | |
| 4,881,779 | A | * | 11/1989 | Bubien | A47C 5/005 297/440.13 |
| 5,040,847 | A | | 8/1991 | Nguyen | |
| 5,104,181 | A | * | 4/1992 | Lange | A47C 3/029 297/271.4 |
| 5,253,389 | A | * | 10/1993 | Colin | B60B 33/066 16/34 |
| 5,365,635 | A | * | 11/1994 | Jang | B60B 33/0039 16/34 |
| 5,372,405 | A | * | 12/1994 | Cash | B60N 2/58 297/229 |
| 5,490,715 | A | | 2/1996 | Opsvik | |
| 5,778,488 | A | * | 7/1998 | Tsai | A45C 5/146 280/37 |
| 5,876,173 | A | * | 3/1999 | English, Jr. | B60B 33/066 254/8 R |
| 5,921,631 | A | * | 7/1999 | Bush | A47C 3/029 297/440.13 |
| 6,419,319 | B1 | * | 7/2002 | Sakurai | B60B 33/001 297/344.12 |
| 6,792,630 | B1 | * | 9/2004 | Palmatier | B60B 33/0063 280/43.17 |
| 7,000,993 | B2 | | 2/2006 | Lee | |
| D544,719 | S | | 6/2007 | Fanning | |
| D548,986 | S | | 8/2007 | Mccoy et al. | |
| 7,513,479 | B2 | * | 4/2009 | Li | E04H 12/2238 248/129 |
| 7,610,682 | B2 | * | 11/2009 | Polevoy | A47C 7/006 16/24 |
| D612,161 | S | | 3/2010 | Paulin | |
| 7,770,965 | B2 | * | 8/2010 | Zwezdaryk | A47C 15/008 297/118 |
| 8,087,126 | B2 | * | 1/2012 | Duvert | A47D 7/00 16/33 |
| 8,167,377 | B2 | * | 5/2012 | Kovach | A47C 4/03 297/440.13 |
| D669,276 | S | | 10/2012 | Schaack | |
| D702,956 | S | | 4/2014 | Holscher | |
| D713,164 | S | | 9/2014 | Pedersen et al. | |
| D740,043 | S | | 10/2015 | Lee | |
| D746,075 | S | | 12/2015 | Lievore et al. | |
| D770,792 | S | | 11/2016 | George, II et al. | |
| D776,949 | S | | 1/2017 | Hashemi | |
| D777,461 | S | | 1/2017 | Hashemi | |
| D806,426 | S | | 1/2018 | George, II et al. | |
| D904,044 | S | | 12/2020 | Weiss et al. | |
| D909,079 | S | | 2/2021 | Ding et al. | |
| D1,013,400 | S | | 2/2024 | Concodoro | |
| D1,032,225 | S | | 6/2024 | Anderson et al. | |
| D1,039,284 | S | | 8/2024 | Weiss et al. | |
| D1,040,538 | S | | 9/2024 | Liljencrantz | |
| 2005/0006943 | A1 | * | 1/2005 | Wieland | A47C 4/021 297/440.13 |
| 2005/0110326 | A1 | | 5/2005 | Leong | |
| 2005/0217071 | A1 | * | 10/2005 | Shinner | B60B 33/0028 16/19 |
| 2008/0252130 | A1 | * | 10/2008 | Wieland | A47C 13/005 297/451.8 |
| 2010/0088846 | A1 | * | 4/2010 | Salus | B60B 33/0023 16/34 |
| 2011/0095579 | A1 | * | 4/2011 | Hill | A47C 11/00 40/542 |
| 2015/0108418 | A1 | * | 4/2015 | Chang | B27B 5/10 254/418 |
| 2023/0211633 | A1 | * | 7/2023 | Herman | A61G 15/002 16/33 |

FOREIGN PATENT DOCUMENTS

| | | | |
|---|---|---|---|
| CN | 3650798 | | 5/2007 |
| CN | 203168525 | U | 9/2013 |
| DE | 6609287 | U | 4/1972 |
| DE | M9107397-0004 | | 4/1992 |
| DE | 4139062 | A1 | 6/1993 |
| DE | 202006015434 | U1 | 12/2006 |
| DK | MR199900487-0001 | | 5/1999 |
| EM | 000469895-0001 | | 2/2006 |
| EM | 000699293-0013 | | 5/2007 |
| EM | 000715461-0001 | | 5/2007 |
| EM | 000719604-0022 | | 7/2007 |
| GB | 1348631 | A | 3/1974 |
| GB | 1471927 | A | 4/1977 |
| GB | 2086854 | | 12/1999 |
| GB | 3014516 | | 1/2004 |
| GB | 3018871 | | 10/2004 |
| JP | S6365501 | U | 4/1988 |
| JP | H092010 | A | 1/1997 |
| JP | H11180104 | A | 7/1999 |
| JP | D1301293 | | 5/2007 |
| WO | D010149-002 | | 3/1988 |
| WO | D025686-003 | | 5/1993 |
| WO | D061294-003 | | 10/2002 |
| WO | D061881-004 | | 12/2002 |
| WO | D062052-001 | | 1/2003 |
| WO | D067900-028 | | 11/2006 |

OTHER PUBLICATIONS

Douglas Deeds, "Moulded fiberglass chair designed by Douglas Deeds ," Powerhouse Collection <https://collection.maas.museum/object/167967> Aug. 22, 1999.

Pippin Lounge Chair by Lucy Kurrein, first available: Unknown. naughtone.com [online], [site visited Jun. 11, 2024], Internet URL: https://www.naughtone.com/us/products/pippin/ (Year: 2024).

Pippin Lounge Chair by NaughtOne, first available: Jun. 8, 2023. Millerknoll.com [online], [site visited Jun. 14, 2024], Internet URL: https://news. millerknoll.com/2023-06-08-NaughtOne-Introduces-Fiexible-Mobile-Lounge-Chair,-Pippin (Year: 2023).

U.K. Intellectual Property Office. Combined Search and Examination Report for Application No. GB2407361.1, dated Nov. 14, 2024 (6 pages).

U.K. Intellectual Property Office Examination Report for Application No. GB2506507.9, dated Oct. 28, 2025 (10 pages).

* cited by examiner

ARTICLE OF FURNITURE

CROSS-REFERENCE TO RELATED APPLICATIONS

This application claims priority to U.S. Provisional Patent Application No. 63/503,863, filed May 23, 2023, the entire contents of which are incorporated herein by reference.

BACKGROUND OF THE INVENTION

The present application relates to articles of furniture, and more particularly to a seating structure, such as a chair.

SUMMARY

In one aspect, the invention provides, an article of furniture including a foam base, a rigid frame, and a padded support. The foam base includes a foam seat, a foam back extending from the foam seat, and a slot extending along the foam seat. The rigid frame includes a frame seat, a frame back, and a projection. The frame seat is configured to engage the foam seat. The frame back is configured to engage the foam back. The projection is configured to be received in the slot. The padded support includes a padded seat, a padded back, or both. The padded support is disposed on a side of the rigid frame opposite the foam base. The padded seat is configured to engage the frame seat. The padded back is configured to engage the frame back.

In another aspect, the invention provides, an article of furniture including a base, a seat on a top side of the base, a base platform coupled to a bottom side of the base opposite the top side, and a plurality of caster assemblies coupled to the base platform. The plurality of caster assemblies is pivotable relative to the base platform between an extended position, in which the plurality of caster assemblies extends outwardly from the base platform and supports the article of furniture on a surface and the base platform is spaced apart from the surface, and a retracted position, in which the plurality of caster assemblies is retracted into the base platform and at least a portion of the base platform contacts the surface.

In another aspect, the invention provides, a caster assembly for an article of furniture. The caster assembly includes a housing rotatably coupled to the article of furniture about a rotation axis, a pivot arm having a first end and a second end opposite the first end, a wheel rotatably coupled to the second end of the pivot arm, a biasing member disposed between the housing and the pivot arm to bias the pivot arm away from the housing to an extended position, and a bearing positioned between the housing and the article of furniture. The first end is pivotably coupled to the housing about a pivot axis. The bearing is configured to facilitate rotation of the housing relative to the article of furniture.

Other aspects of the invention will become apparent by consideration of the detailed description and accompanying drawings.

DETAILED DESCRIPTION

Figure 1:
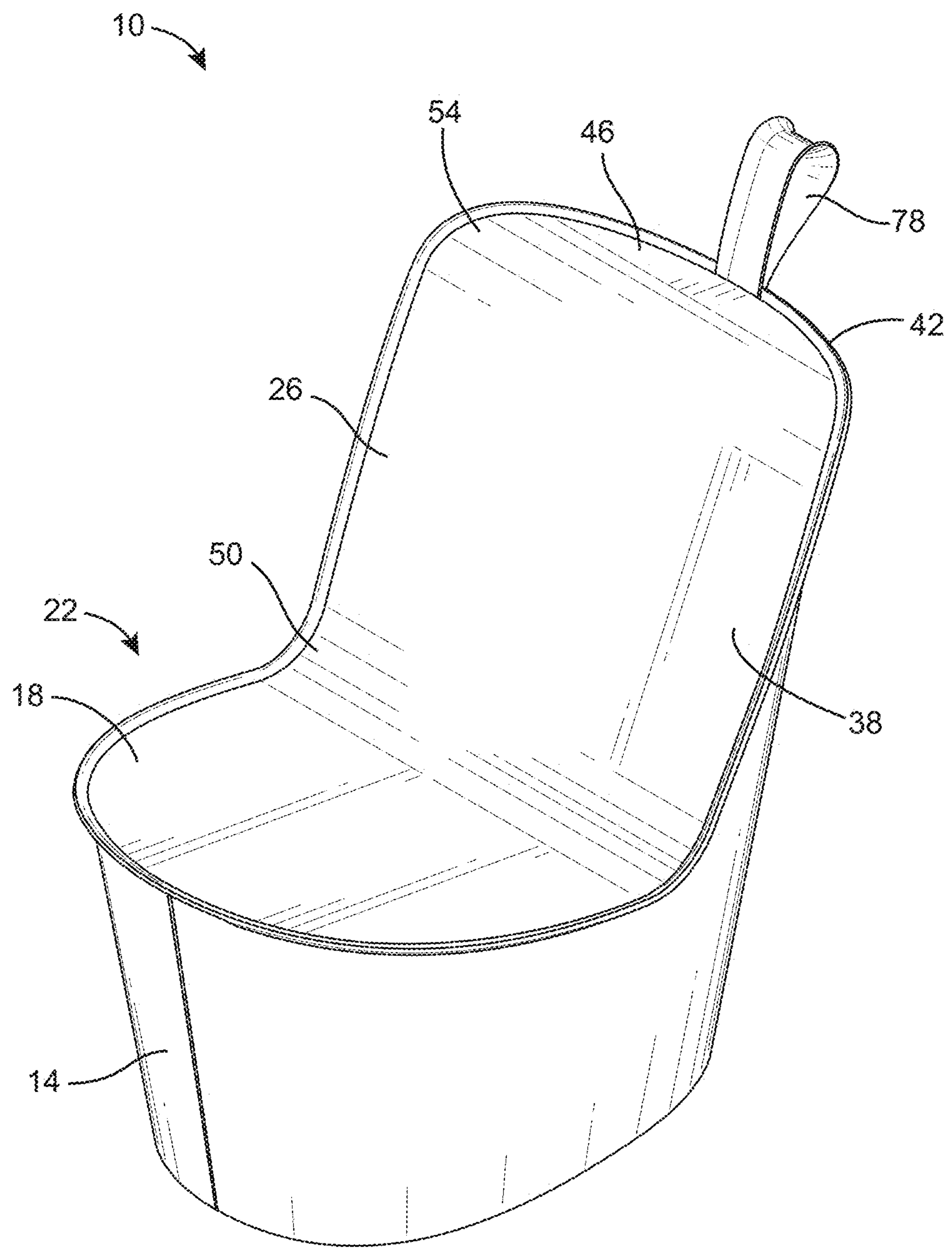
FIG. 1 is a perspective view of a chair.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-4 illustrate an article of furniture such as a chair 10 or other seating structure. The chair 10 includes a base 14, a seat 18 on a top side 22 of the base 14, a back rest 26 extending from the top side 22 of the base 14, and a rigid platform 30 coupled to a bottom side 34 of the base 14 (e.g., via a plurality of fasteners 36). The seat 18 and the back rest 26 together define a seating surface 38. The seating surface 38 is bordered by a seating edge 42. The illustrated seating edge 42 extends from the chair 10 (e.g., like a flange). Although the illustrated chair 10 has a particular shape, other articles of furniture may have other shapes or configurations. For example, the shapes of the base 14, the seat 18, and/or the back rest 26 may be different. Alternatively, the article of furniture may be a couch, settee, stool, and the like.

Figure 2:
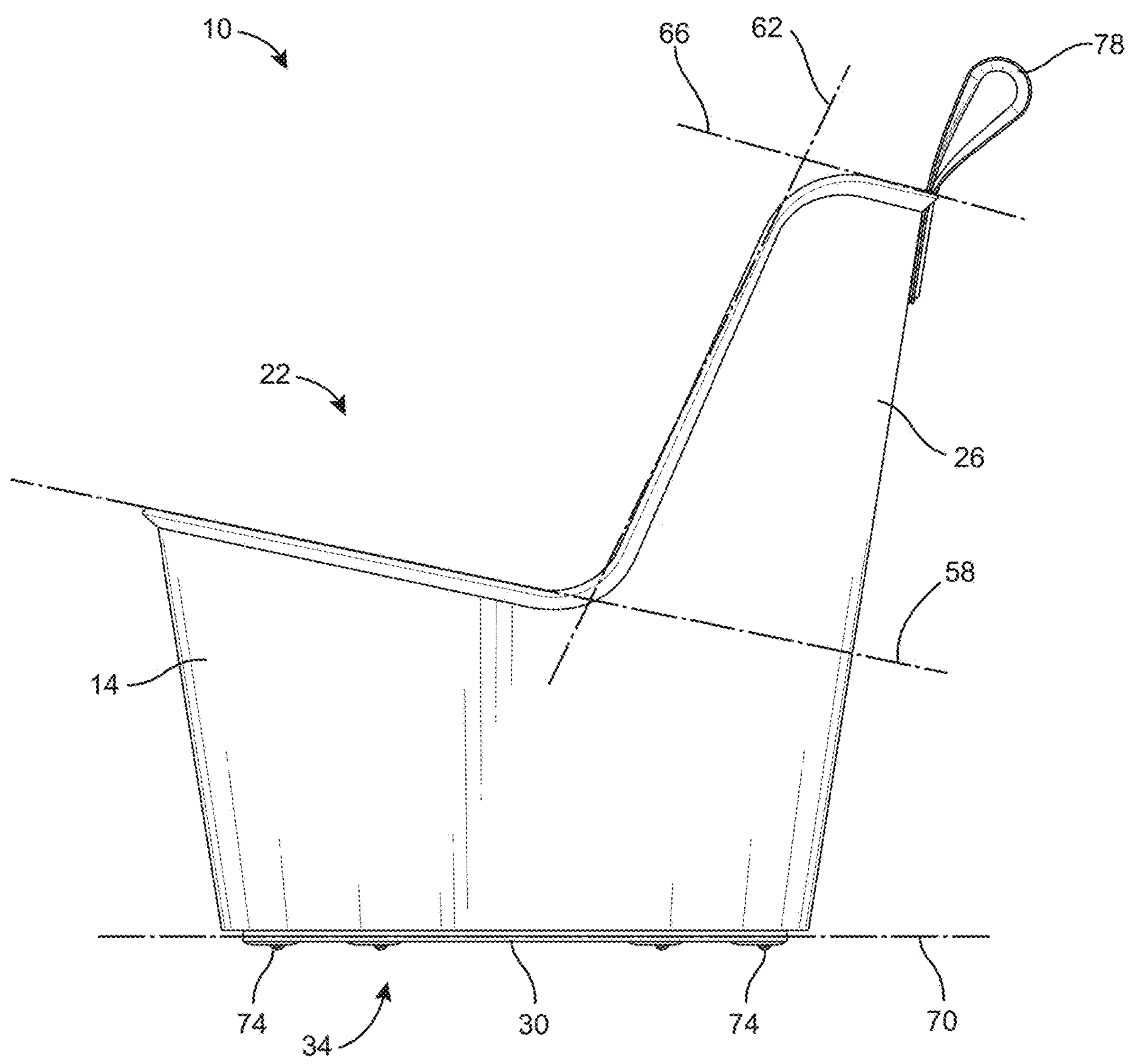
FIG. 2 is a side view of the chair of FIG. 1.

With specific reference to FIGS. 1 and 2, the seating surface 38 is further defined by a rounded end portion 46 on a side of the back rest 26 opposite the seat 18. The seating surface 38 includes a lower transition portion 50 positioned between the seat 18 and the back rest 26, and an upper transition portion 54 positioned between the back rest 26 and the end portion 46. The illustrated lower transition portion 50 is concave and the illustrated upper transition portion 54 is convex. In some embodiments, the lower transition portion 50 may define a radius equal to a radius defined by the upper transition portion 54. In other embodiments, the transition portions 50, 54 may define different radii.

As best illustrated in FIG. 2, the seat 18 defines a seat plane 58, the back rest 26 defines a back rest plane 62, and the end portion 46 defines an end plane 66. The illustrated seat plane 58 intersects the back rest plane 62 and the end plane 66. In some embodiments, the seat and end planes 58, 66 are parallel. In other embodiments, the seat and end planes 58, 66 are non-parallel. The seat, back rest, and end planes 58, 62, 66 intersect a base plane 70 defined by the bottom side 34 of the base 14.

Figure 3:
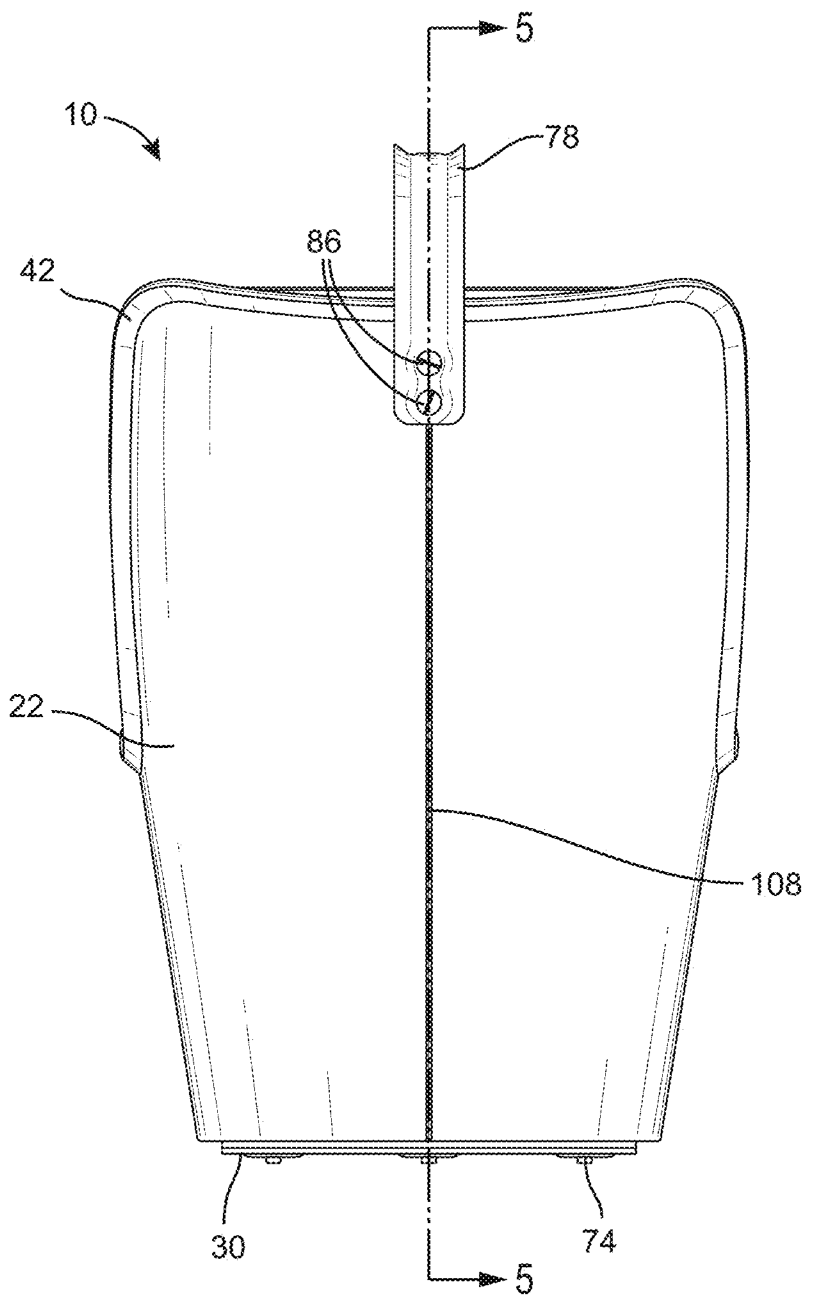
FIG. 3 is a rear view of the chair of FIG. 1.
Figure 4:
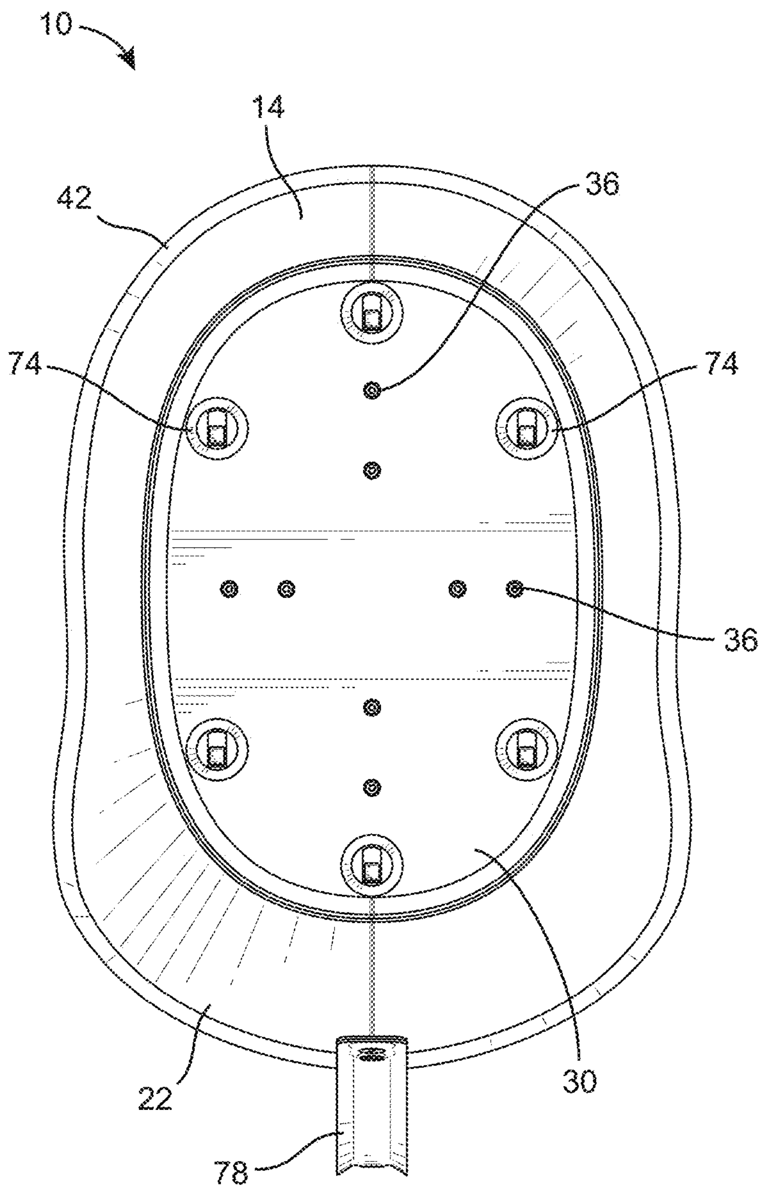
FIG. 4 is a bottom view of the chair of FIG. 1.

With reference to FIGS. 2-4, a plurality of wheels 74 (e.g., caster wheels, linear wheels, omni-directional, etc.) are coupled to the platform 30. The chair 10 is configured to move along a surface via the wheels 74. The illustrated chair 10 includes six wheels 74 illustrated in a generally hexagonal pattern. The wheels 74 are positioned at or adjacent a perimeter or outer edge of the platform 30. In other embodiments, the chair 10 may include fewer or more wheels 74 (e.g., three, four, seven, etc.) oriented in any pattern. In some embodiments, the wheels 74 may be omitted. In such embodiments, the chair 10 may include legs or feet to support the chair 10 above the surface, or the base 14 may directly engage the surface.

As best illustrated in FIG. 3, the chair 10 includes a handle 78 coupled to a rear side 82 of the back rest 26. The illustrated handle 78 is coupled to the back rest 26 via two handle fasteners 86. The fasteners 86 may be, for example, rivets, screws, snaps, and the like. In some embodiments, the handle 78 may be coupled to the back rest 26 via fewer or more handle fasteners 86 (e.g., one, three, four, etc.). In other embodiments, the handle 78 may be sewn or glued to the back rest 26.

Figure 5:
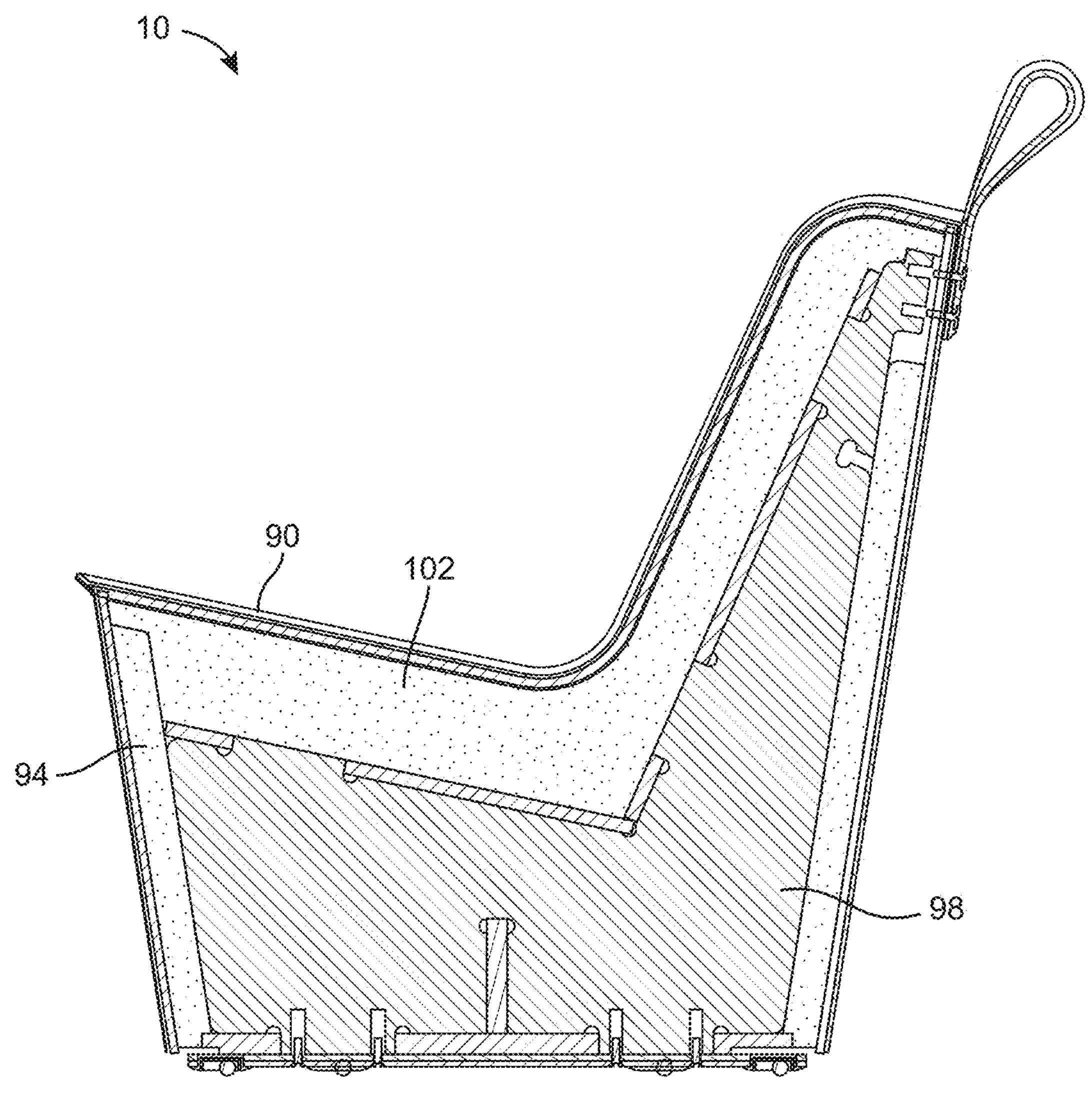
FIG. 5 is a cross-sectional view of the chair of FIG. 1 taken along line 5-5 in FIG. 3.
Figure 6:
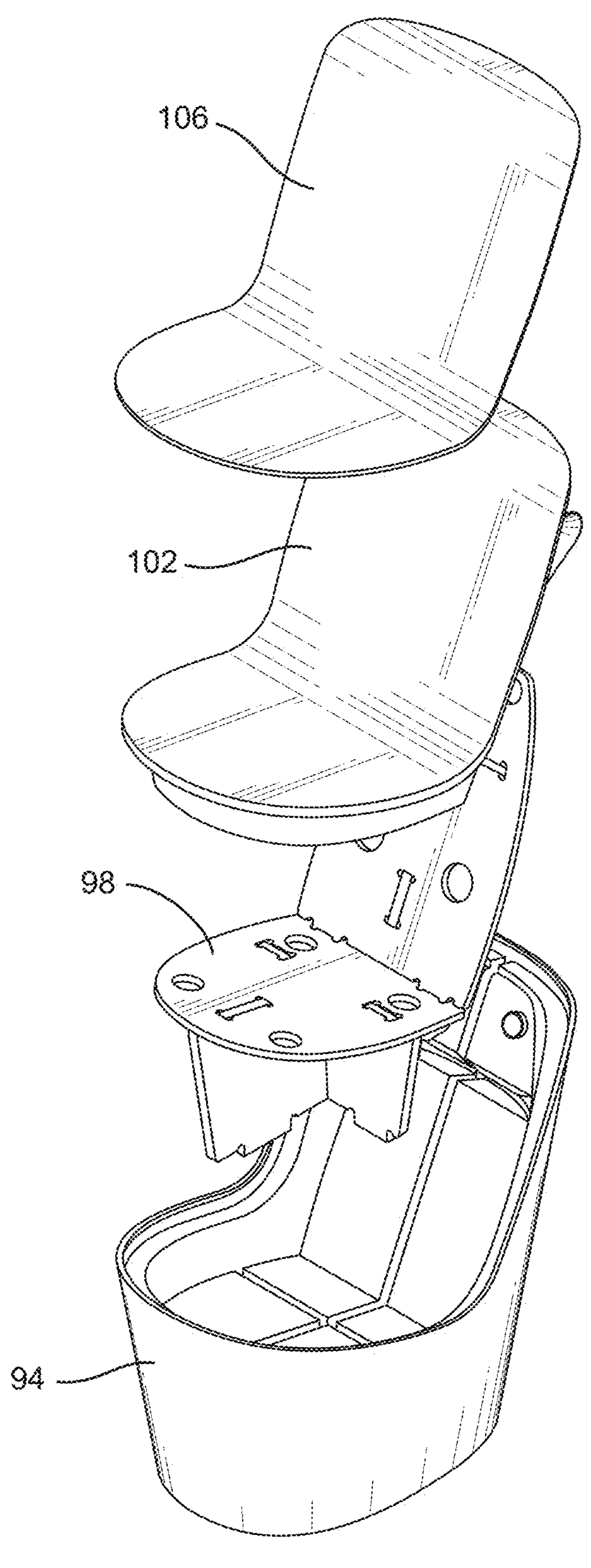
FIG. 6 is a partial exploded view of the chair of FIG. 1.

With reference to FIGS. 5 and 6, the chair 10 includes a cover 90, a foam base 94, a rigid frame 98, a padded support 102, and a cover pad 106. The illustrated cover 90 is a single piece cover 90. The cover 90 may be coupled together (e.g., at a seam 108 (FIG. 3), at the seating edge 42, etc.). The cover 90 is formed without additional fasteners. The cover 90 surrounds the foam base 94, the rigid frame 98, the padded support 102, and the cover pad 106. The illustrated rigid frame 98 is configured to be received in slots 110 (FIG. 7) within the foam base 94. The illustrated padded support 102 is positioned on a side of the rigid frame 98 opposite the foam base 94. In some embodiments, the padded support 102 may be coupled to the rigid frame 98 (e.g., via fasteners, glue, tape, etc.). The illustrated cover pad 106 is positioned on a side of the padded support 102 opposite the rigid frame 98. In some embodiments, the cover pad 106 may be coupled to the padded support 102. In other embodiments, the cover pad 106 may be integrally formed with the padded support 102. In yet other embodiments, the cover pad 106 may be omitted. The illustrated padded support 102 and cover pad 106 are composed of foam. In other embodiments, the padded support 102 and/or the cover pad 106 may be composed of a different soft material.

Figure 7:
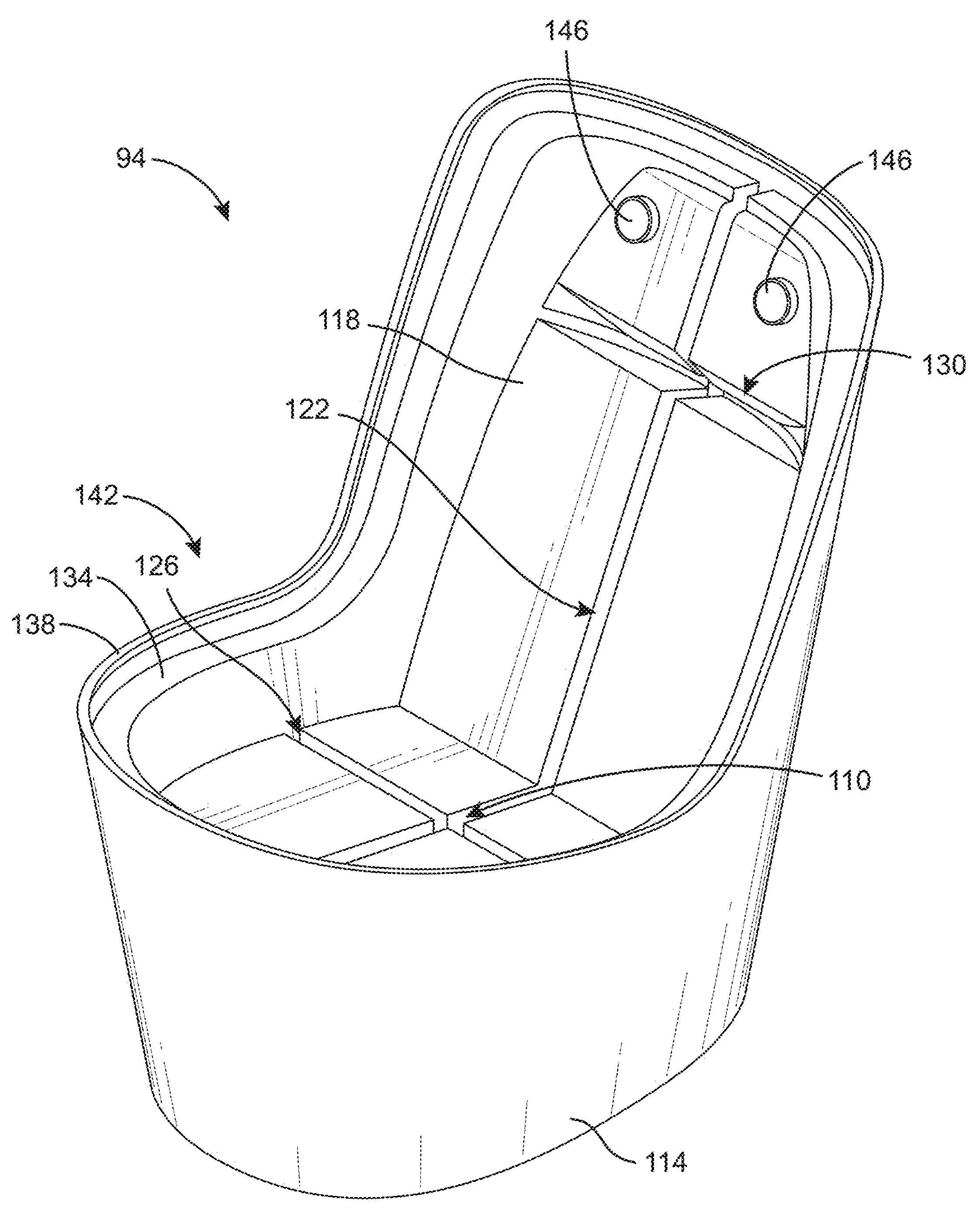
FIG. 7 is a perspective view of a base of the chair of FIG. 1.
Figure 8:
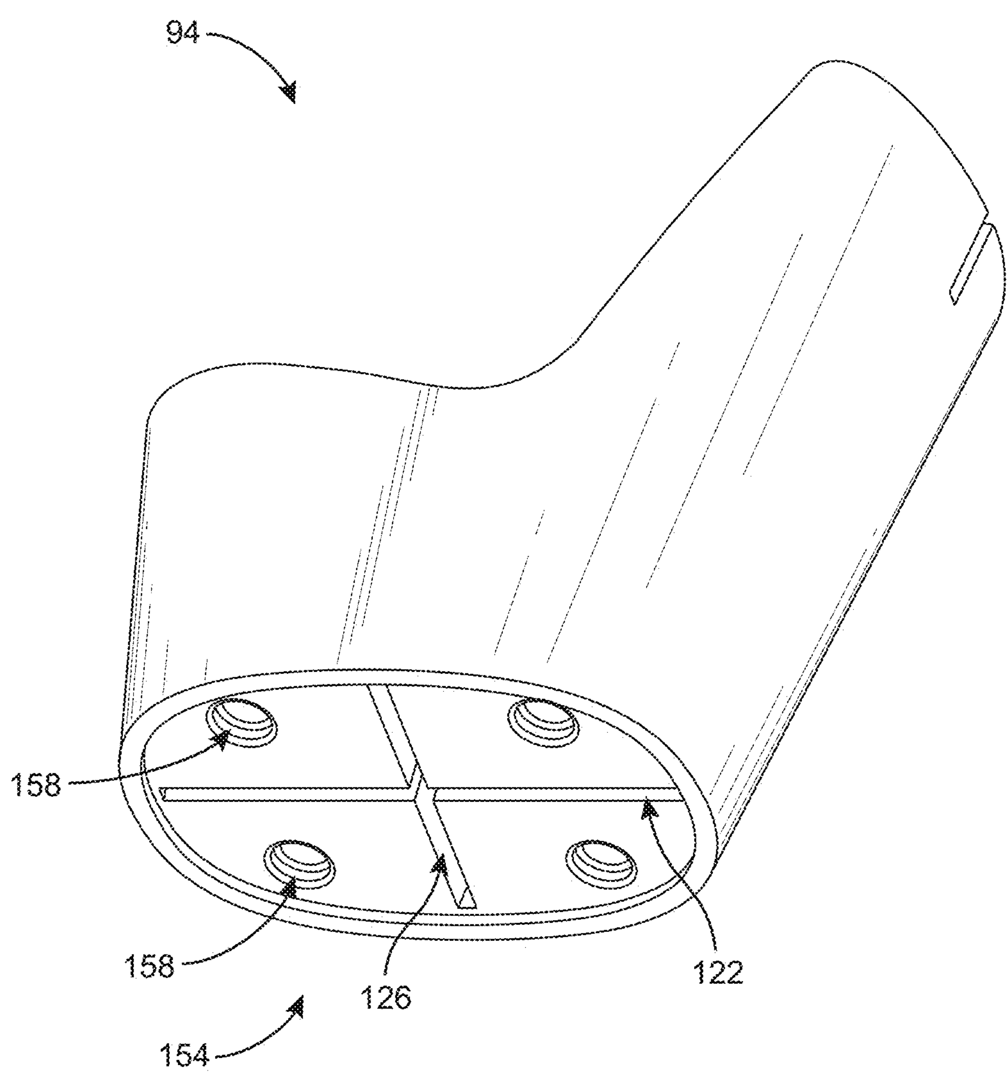
FIG. 8 is a bottom perspective view of the base of FIG. 1.

With reference to FIGS. 7 and 8, the foam base 94 includes a body 114 (also referred to as a foam seat 114) and a back rest 118 extending from the body 114. The foam base 94 may be a molded foam base. The slots 110 include a longitudinal slot 122, a body slot 126, and a back slot 130. The longitudinal slot 122 extends along the body 114 and the back rest 118. The longitudinal slot 122 also extends from a front of the chair 10 to a rear of the chair 10. The longitudinal slot 122 may define a longitudinal plane, which defines a plane of symmetry of the foam base 94. The body slot 126 intersects the longitudinal slot 122 in the body 114. The illustrated body slot 126 is perpendicular to the longitudinal slot 122. The body slot 126 extends between opposing sides of the chair 10. The back slot 130 intersects the longitudinal slot 122 in the back rest 118. The illustrated back slot 130 is perpendicular to the longitudinal slot 122. The back slot 126 extends between the opposing sides of the chair 10. The longitudinal slot 122 and the body slot 126 form a cross-shaped slot together. The cross-shaped slot may also be referred to as a profiled recess or slot.

With reference to FIG. 7, the foam base 94 includes an inner lip 134 and an outer lip 138 on a top side 142 of the foam base 94. The inner lip 134 is recessed into the foam base 94 relative to the outer lip 138. The lips 134, 138 extend around the entire top side 142. The illustrated inner lip 134 has a width greater than a width of the outer lip 138. The illustrated longitudinal slot 122 extends through the inner lip 134.

With continued reference to FIG. 7, the foam base 94 includes a plurality of base bosses 146 extending from the back rest 118. The illustrated plurality of base bosses 146 includes two base bosses 146, with one on each side of the longitudinal slot 122. In other embodiments, the foam base 94 may include fewer or more base bosses 146 (e.g., one, three, four, etc.). The base bosses 146 are configured to be received in base apertures 150 in the rigid frame 98 (FIG. 10).

With reference to FIG. 8, the longitudinal slot 122 and the body slot 126 extend through a bottom side 154 of the body 114. The bottom side 154 includes a plurality of bottom body recesses 158. The illustrated bottom side 154 includes four bottom body recesses 158, with one bottom body recess 158 in each quadrant defined by the longitudinal and body slots 122, 126. The body recesses 158 may be configured to receive legs, pegs, casters, or the like.

Figure 9:
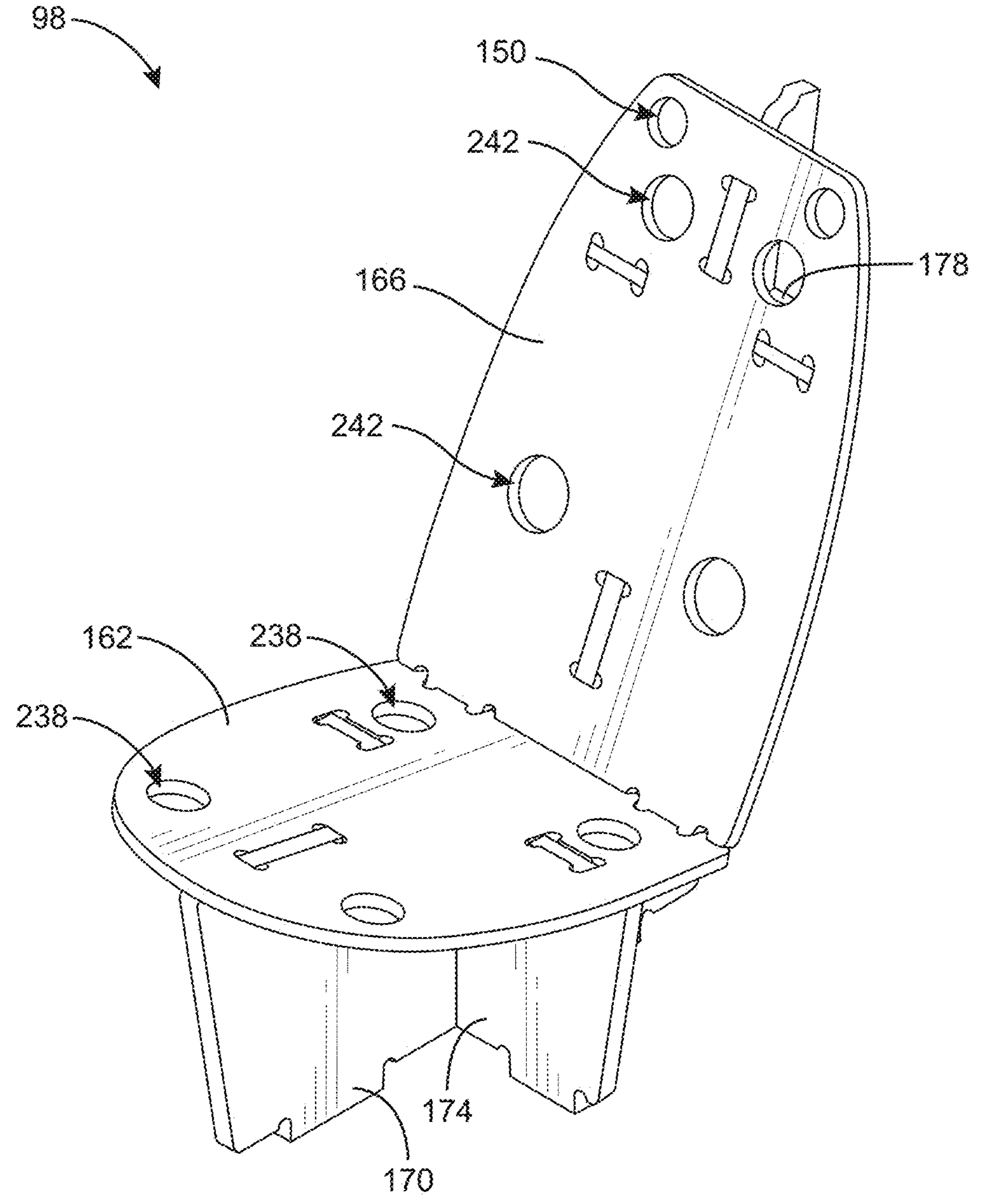
FIG. 9 is a perspective view of a frame of the chair of FIG. 1.
Figure 10:
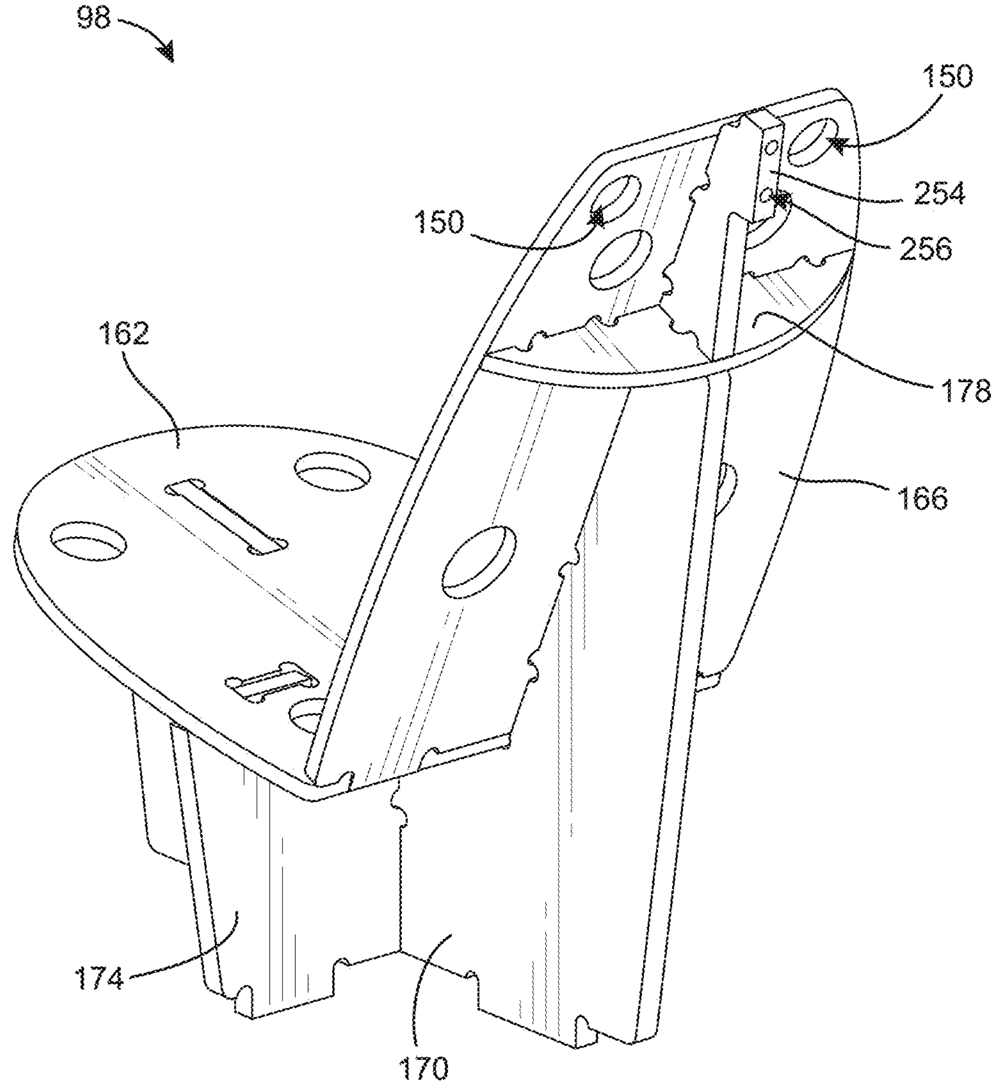
FIG. 10 is another perspective view of the frame of FIG. 9.
Figure 11:
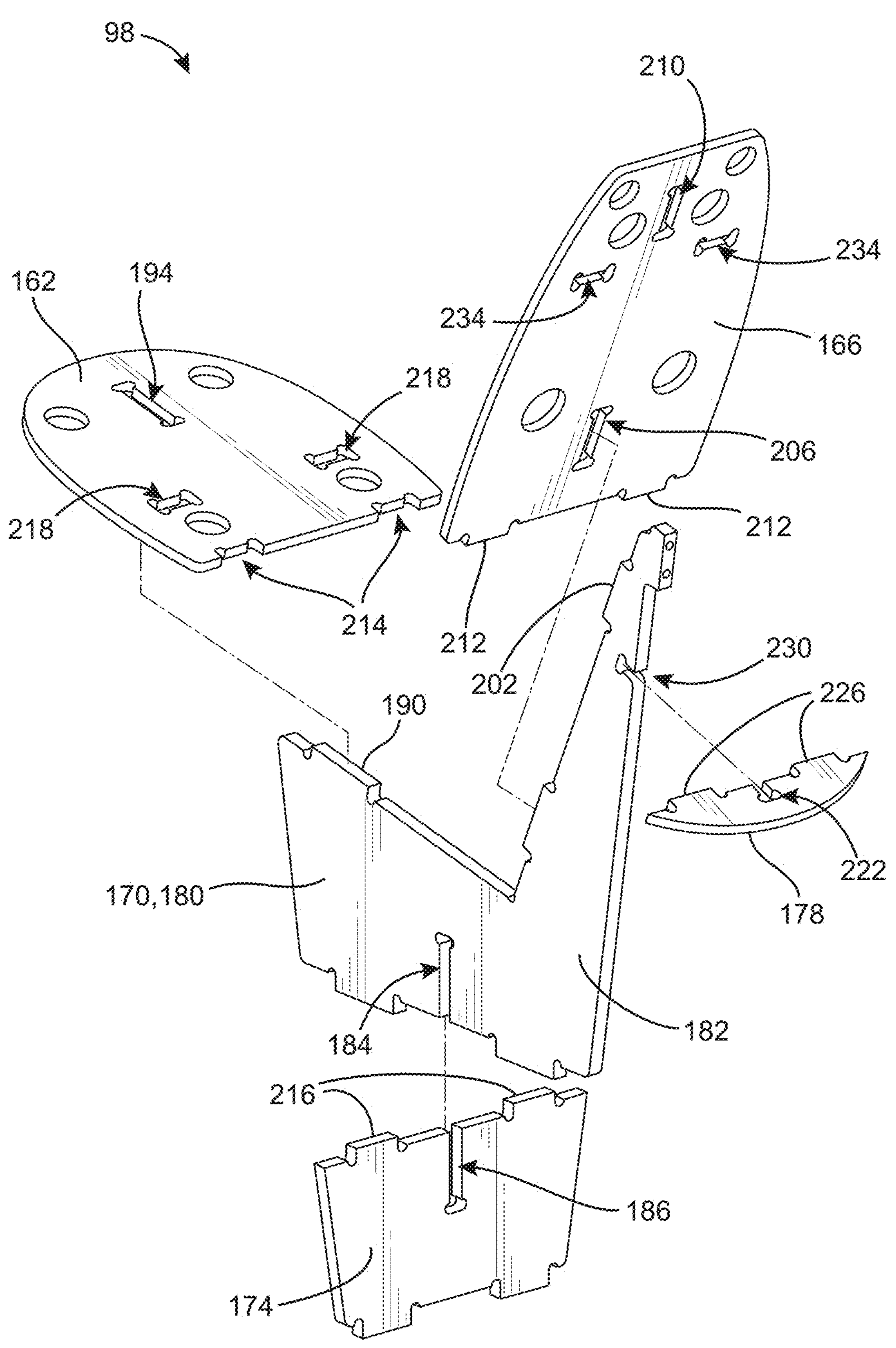
FIG. 11 is an exploded view of the frame of FIG. 9.

With reference to FIGS. 9-11, the rigid frame 98 includes a plurality of sections coupled together. The illustrated plurality of sections includes a frame seat 162, a frame back rest 166, a frame spine 170, a frame body 174, and a frame back support 178. The frame spine 170 is configured to be received in the longitudinal slot 122, and the frame body 174 is configured to be received in the body slot 126. In other embodiments, the plurality of sections may include fewer or more sections. Each section of the frame 98 is a planar section. The illustrated rigid frame 98 is composed of wood (e.g., plywood). In other embodiments, the rigid frame 98 may be composed of another sturdy material.

As best illustrated in FIG. 11, the plurality of sections is configured to be coupled together via cooperating slots or projections received in slots. The illustrated frame spine 170 includes a spine base 180 and a spine support 182. The illustrated frame spine 170 includes a lower spine slot 184 on a lower side of the spine base 180 that cooperates with an upper body slot 186 in the frame body 174 to couple the frame spine 170 to the frame body 174. The frame spine 170 includes an upper spine body projection 190 on an upper side of the spine base 180 that is received in a central seat slot 194 in the frame seat 162 to couple the frame spine 170 to the frame seat 162. The frame spine 170 further includes a lower spine back projection 198 and an upper spine back projection 202. The lower spine back projection 198 is configured to be received in a lower central slot 206 in the frame back rest 166. The upper spine back projection 202 is configured to be received in an upper central slot 210 in the frame back rest 166. The frame back rest 166 further includes two lower back rest projections 212, which are configured to be received by respective rear seat recesses 214 in the frame seat 162 to couple the frame back rest 166 to the frame seat 162. The frame body 174 includes two upper body projections 216, which are configured to be received by respective rear seat slots 218 in the frame seat 162 to couple the frame body 174 to the frame seat 162. The frame back support 178 includes a central back support slot 222 and two back support projections 226. The central back support slot 222 is configured to cooperate with a rear spine slot 230 in the frame spine 170 to couple the frame back support 178 to the frame spine 170. The back support projections 226 are configured to be received in respective lateral back rest slots 234 in the frame back rest 166 to couple the frame back support 178 to the frame back rest 166. In other embodiments, each of the sections may include fewer or more slots or projections to couple to other sections. The slots and the projections allow the plurality of sections of the rigid frame 98 to be coupled together without additional fasteners (e.g., screws, nails, rivets, etc.) or adhesives. Together, the lower portions of the frame spine 170 and the frame body 174 form a cross-shaped projection. The cross-shaped projection corresponds to the cross-shaped recess of the foam base 94. The cross-shaped projection and the cross-shaped recess allow the rigid frame 98 and the base 94 to also be coupled together without additional fasteners or adhesives.

Figure 14:
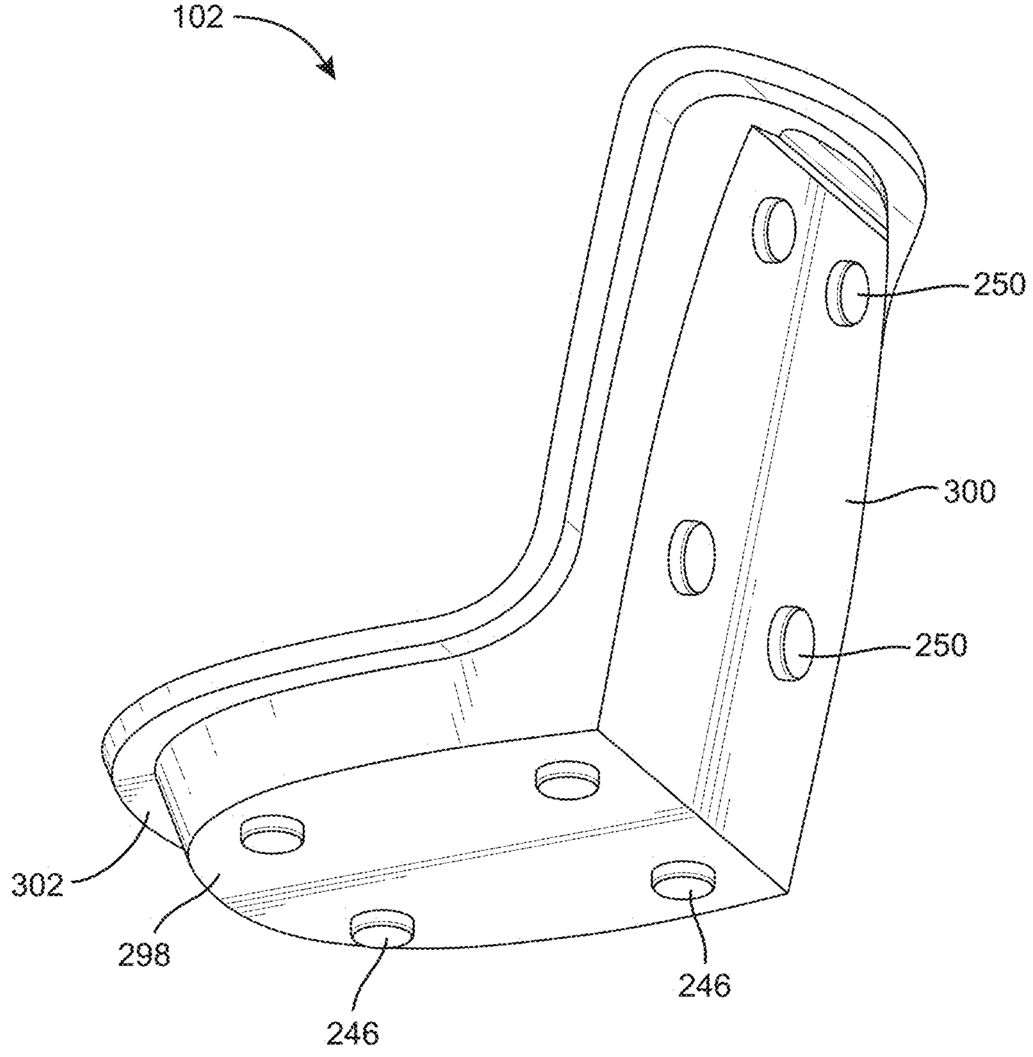
FIG. 14 is another perspective view of the padded support of FIG. 13.

As illustrated in FIG. 9, the frame seat 162 includes a plurality of frame seat recesses 238, and the frame back rest 166 includes a plurality of frame back rest recesses 242. The illustrated frame seat 162 includes four frame seat recesses 238. In other embodiments, the frame seat 162 may include fewer or more frame seat recesses 238 (e.g., two, three, five, etc.). The illustrated frame back rest 166 includes four frame back rest recesses 242. In other embodiments, the frame back rest 166 may include fewer or more frame back rest recesses 242 (e.g., two, three, five, etc.). The frame seat recesses 238 are configured to receive lower bosses 246 of the padded support 102 (FIG. 14). The frame back rest recesses 242 are configured to receive rear bosses 250 of the padded support 102 (FIG. 14).

As illustrated in FIG. 10, the frame spine 170 includes a top shelf 254, which is configured to be received in the longitudinal slot 122 and extend through the inner lip 134. The top shelf 254 includes two handle mounting apertures 256. The handle mounting apertures 256 are configured to receive the handle fasteners 86 to couple the handle 78 to the chair 10.

Figure 12:
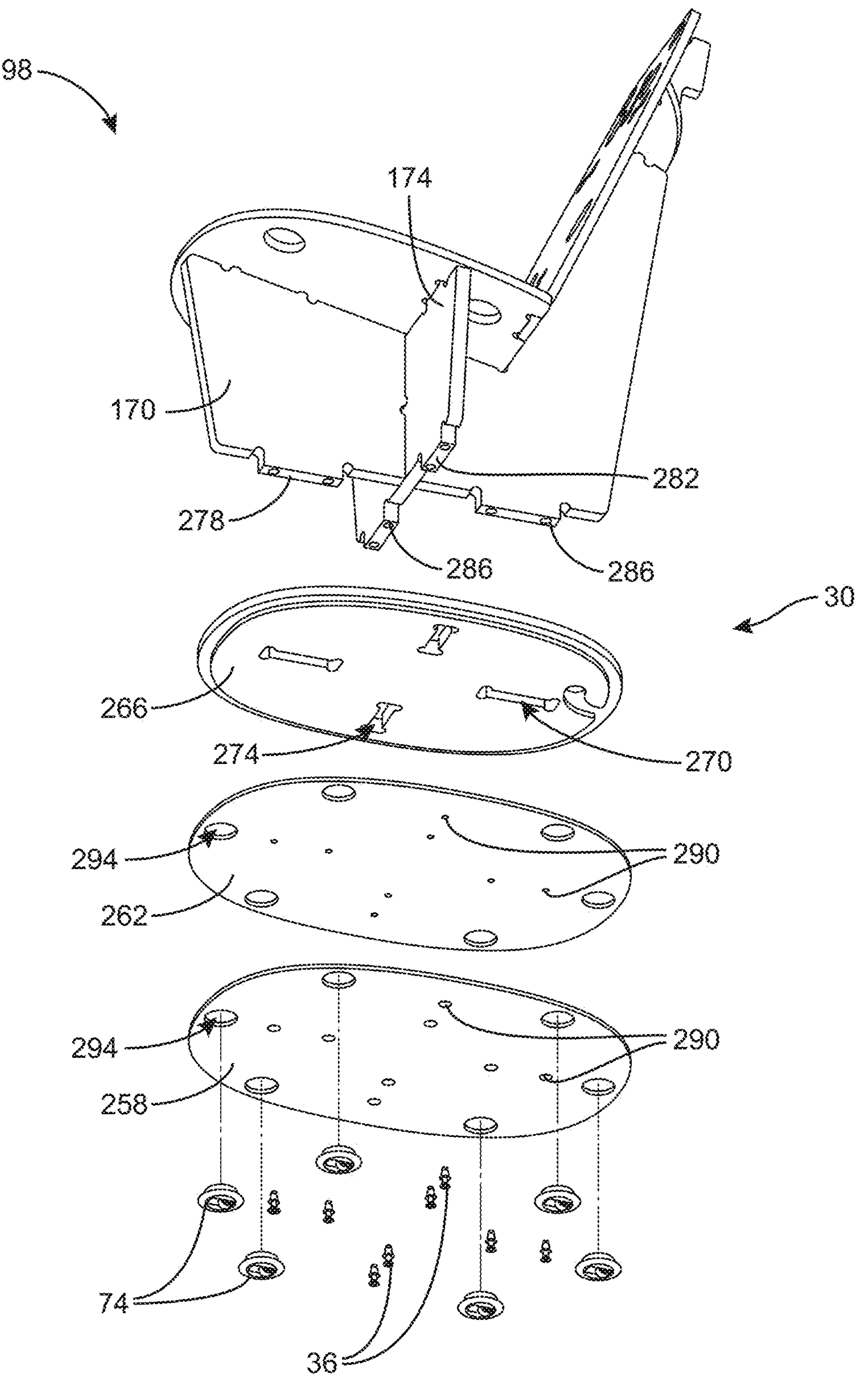
FIG. 12 is an exploded view of a platform of the chair of FIG. 1.

As illustrated in FIG. 12, the platform 30 includes a lower portion 258, an intermediate portion 262, and an upper portion 266. The upper portion 266 includes two central platform slots 270 and two lateral platform slots 274. The central platform slots 270 are configured to receive respective lower frame spine projections 278 of the frame spine 170. The lateral platform slots 274 are configured to receive respective lower frame body projections 282 of the frame body 174. Each of the lower frame spine projections 278 and the lower frame body projections 282 include mounting apertures 286. Each of the illustrated projections 278, 282 includes two mounting apertures 286. In other embodiments, each of the illustrated projections 278, 282 may include fewer or more mounting apertures 286 (e.g., one, three, four, etc.). The illustrated mounting apertures 286 are threaded and are configured to receive the fasteners 36 (e.g., screws, bolts, etc.). The illustrated fasteners 36 are configured to extend through receiving apertures 290 in the lower portion 258 and the intermediate portion 262 and into the mounting apertures 286.

With continued reference to FIG. 12, each of the wheels 74 is received in respective wheel mounting apertures 294 in the lower portion 258 and the intermediate portion 262. In some embodiments, the wheels 74 are threadably coupled to the wheel mounting apertures 294. In other embodiments, the wheels 74 may be coupled to the wheel mounting apertures 294 via glue, fasteners, or the like.

Figure 13:
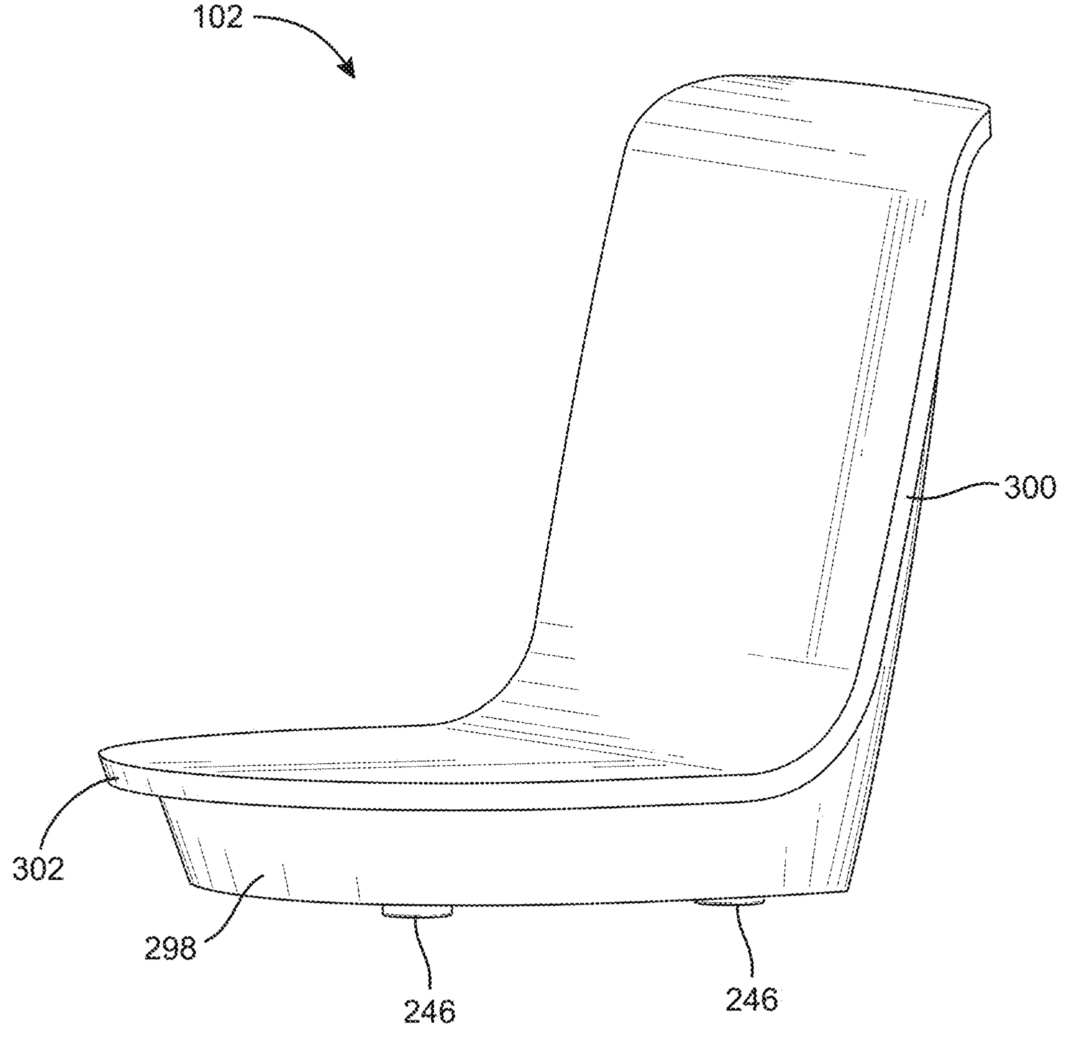
FIG. 13 is a perspective view of a padded support of the chair of FIG. 1.

With reference to FIGS. 13 and 14, the padded support 102 includes a support base 298, a support back 300, and a support flange 302 extending from the support base 298 and the support back 300. The support flange 302 is configured to contact the inner lip 134. In some embodiments, the support flange 302 may be coupled to the inner lip 134.

As best illustrated in FIG. 14, the lower bosses 246 extend from the support base 298, and the rear bosses 250 extend from the support back 300. The illustrated padded support 102 includes lower bosses 246 and four rear bosses 250. In other embodiments, the padded support 102 may include fewer or more lower and/or rear bosses 246, 250. In the illustrated embodiment, each boss 246, 250 is generally cylindrical. In other embodiments, the bosses 246, 250 may have different shapes and/or be different from each other. The bosses 246 facilitate aligning the padded support 102 on the rigid frame 98 and coupling the padded support 102 to the rigid frame 98 without additional fasteners or adhesives.

To assemble the chair 10, the foam base 94 is placed on the ground or sturdy support surface. The rigid frame 98 is then placed into positioning by aligning the cross-shaped projection of the rigid frame 98 with the cross-shaped recess of the foam base 94. As the frame 98 is lowered into position, the base bosses 146 engage the base apertures 150 of the base 94 to secure the frame 98 in place. Next, the padded support 102 is lowered onto the frame 98 with the lower bosses 246 aligning with the lower recesses 238 of the frame seat 162 and the rear bosses 250 aligning with the frame back rest recesses 242 to secure the padded support 102 in place. Then, the cover pad 106 may be coupled to or rested upon the padded support 102. The single piece cover 90 is then secured around the current assembly. Finally, the handle 78 is coupled to the top shelf 254 of the rigid frame 98 via the handle fasteners 86.

Figure 15:
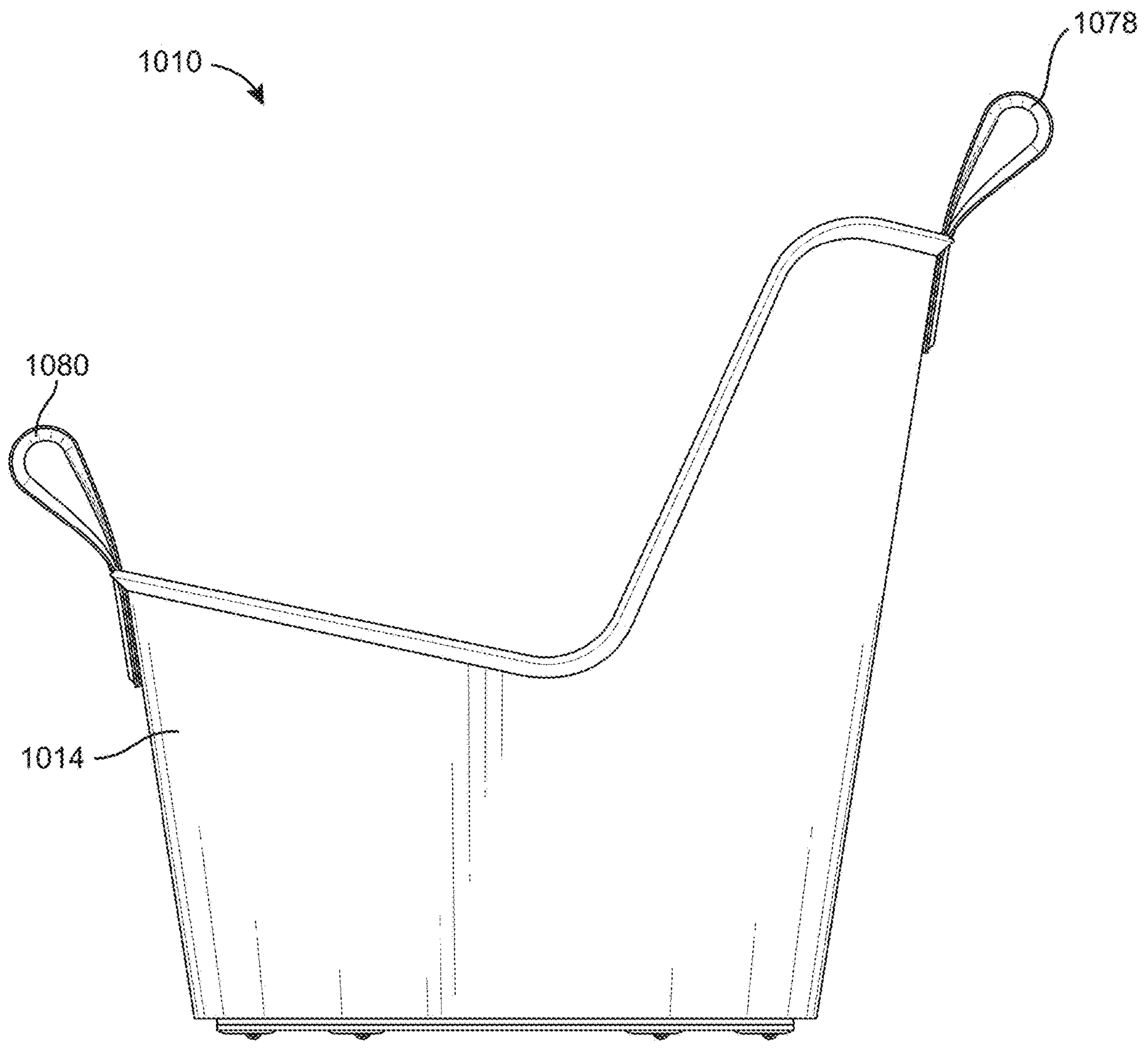
FIG. 15 is a perspective view of another chair.
Figure 16:
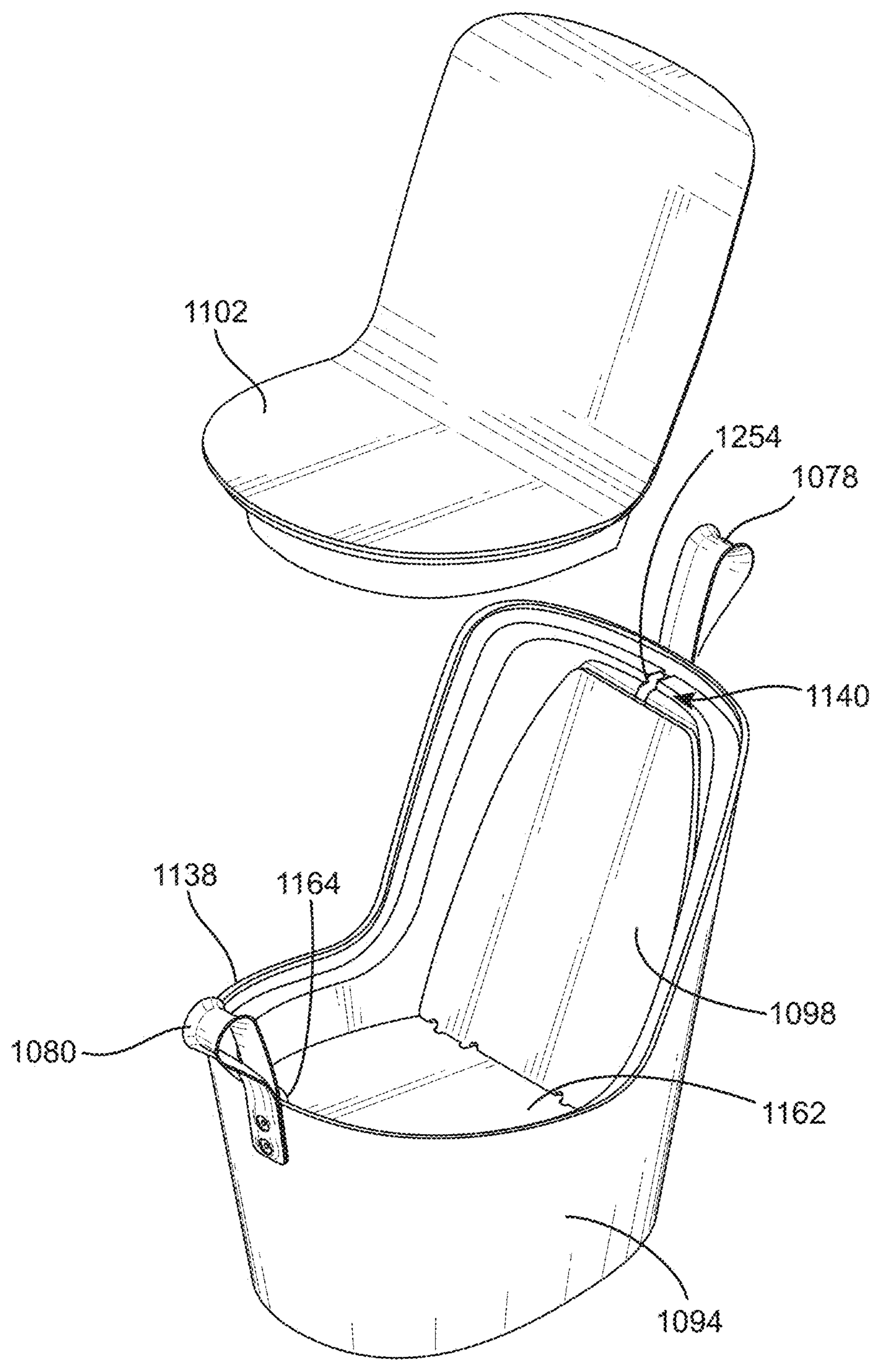
FIG. 16 is a partial exploded view of the chair of FIG. 15.
Figure 17:
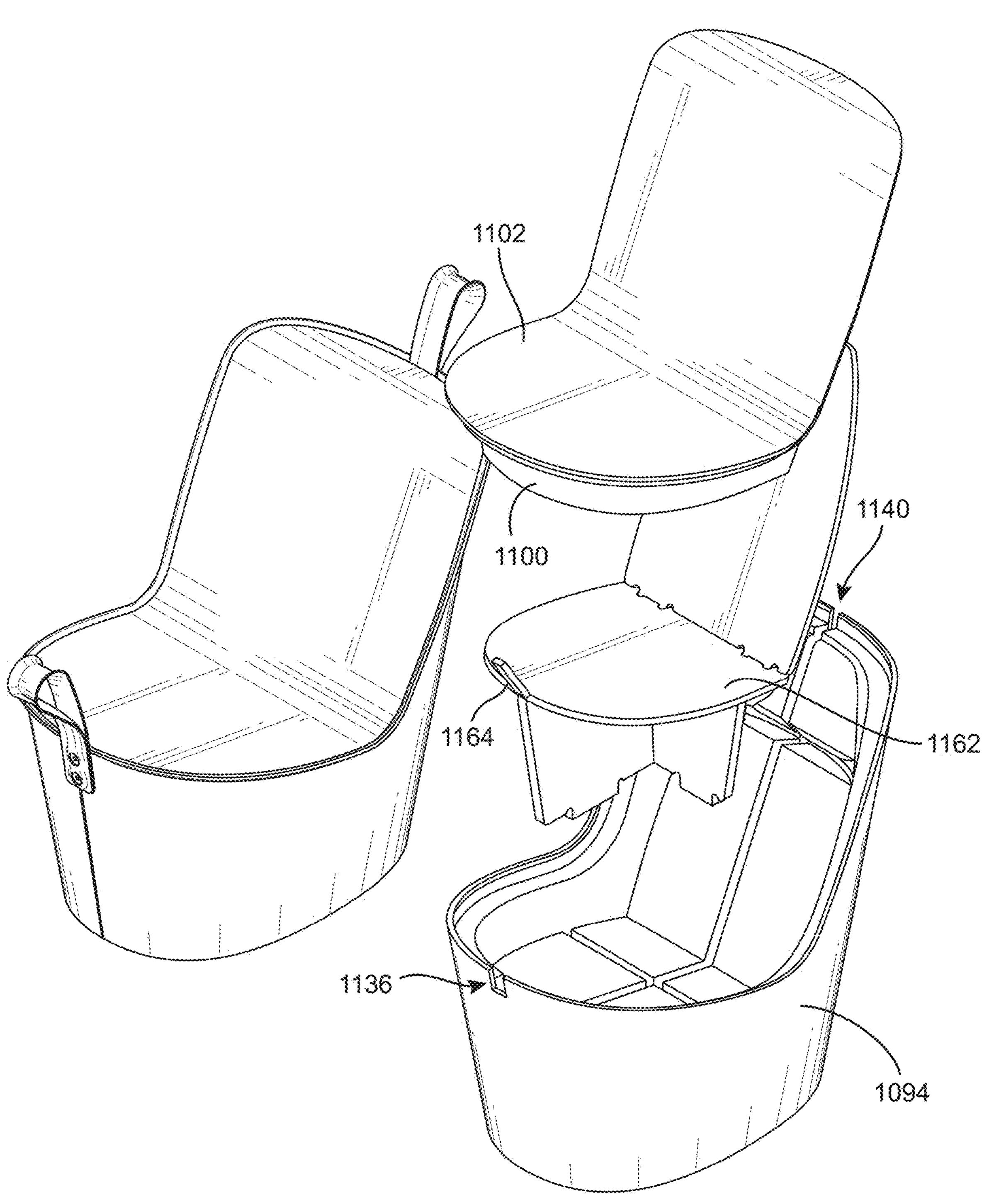
FIG. 17 is another partial exploded view of the chair of FIG. 15.

FIGS. 15-17 illustrate another embodiment of a chair 1010, with terms similar to FIGS. 1-14 labeled similarly plus a value of one thousand. The chair 1010 may include any combination of features from the previous embodiment, but only features of the chair 1010 not yet discussed with respect to the previous embodiment are detailed below.

The chair 1010 includes the handle 1078 (i.e., a first handle 1078), and further includes a second handle 1080 positioned on a side of the base 1014 opposite the first handle 1078. As best illustrated in FIG. 17, the frame seat 1162 of the rigid frame 1098 includes a second handle mount 1164 extending from a side of the frame seat 1162 opposite the frame back rest 1166. The second handle mount 1164 is received in a second cutout 1136 in the outer lip 1138 of the foam base 1094. The second handle mount 1164 includes handle mounting apertures (not shown). The second handle 1080 is configured to be coupled to the second handle mount 1164 via handle fasteners (not shown). The top shelf 1254 is also received in a top cutout 1140 in the outer lip 1138 of the foam base 1094.

With reference to FIG. 17, the second handle mount 1164 is configured to contact a lower rim 1100 of the padded support 1102. The second handle mount 1164 is configured to further secure the padded support 1102 to the rigid frame 1098.

Figure 18:
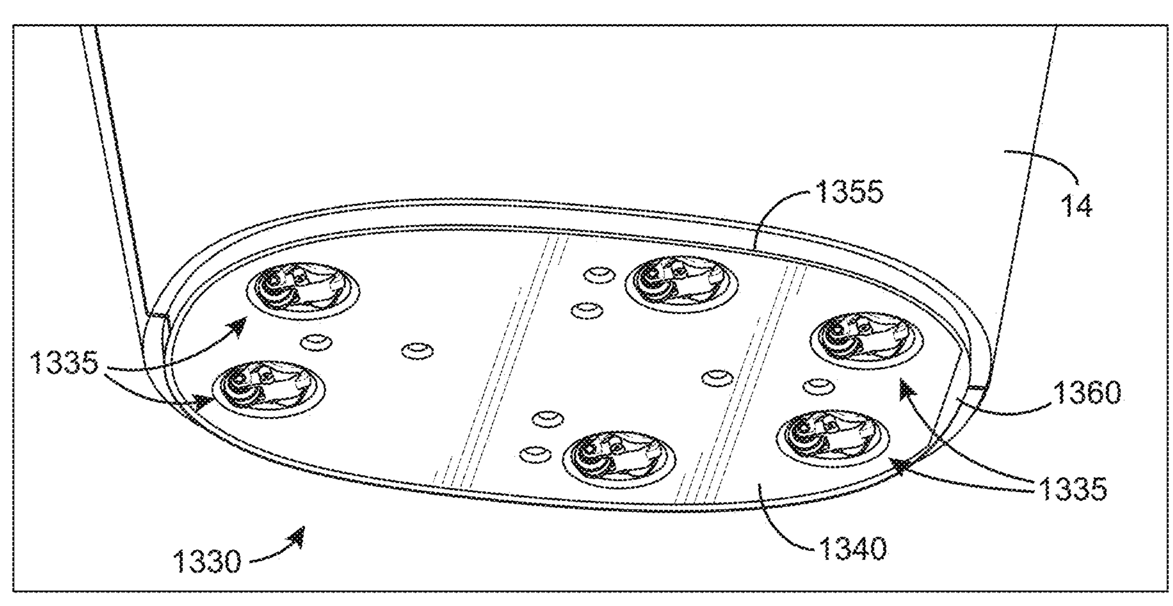
FIG. 18 is a bottom perspective view of the chair of FIG. 1 with a base platform according to another embodiment.

FIG. 18 illustrates a base platform 1330 according to another embodiment of the invention. The base platform 1330 is similar to the platform 30 described above with like reference numbers being used for like features. The base platform 1330 extends from a bottom side of the base 14 to allow movement of the chair 10 across a surface. Specifically, the base platform 1330 includes a plurality of retractable caster wheel assemblies 1335 that support the chair 10 for movement along a surface. In the illustrated embodiment, the base platform 1330 includes six caster wheel assemblies 1335. The caster wheel assemblies 1335 are positioned at or adjacent a perimeter or outer edge of the base platform 1330. In other embodiments, the base platform 1330 may include more than or less than six caster wheel assemblies 1335. In the illustrated embodiment, the base platform 1330 covers a substantial portion (e.g., over 50%) of the bottom side of the base 14. In other embodiments, the base platform 1330 may cover the entire bottom side of the base 14 or a smaller portion of the bottom side of the base 14.

Figure 19:
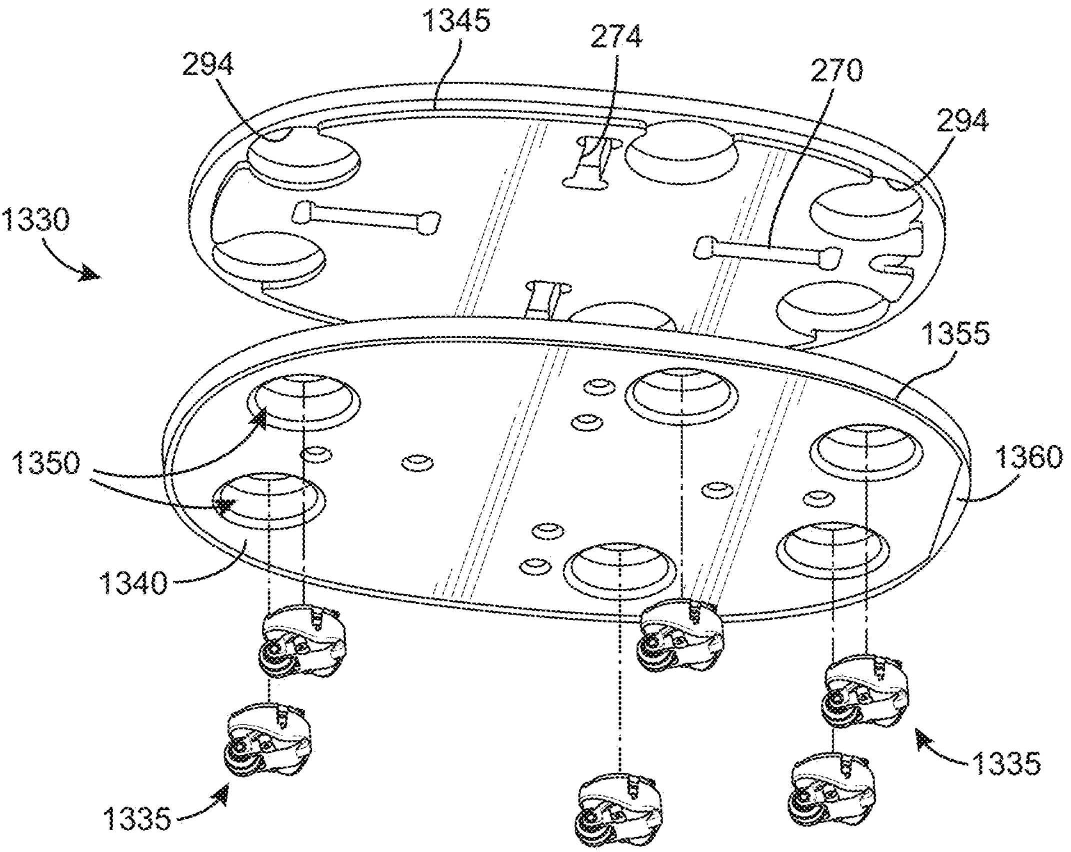
FIG. 19 is a bottom exploded view of the platform of FIG. 18.
Figure 20:
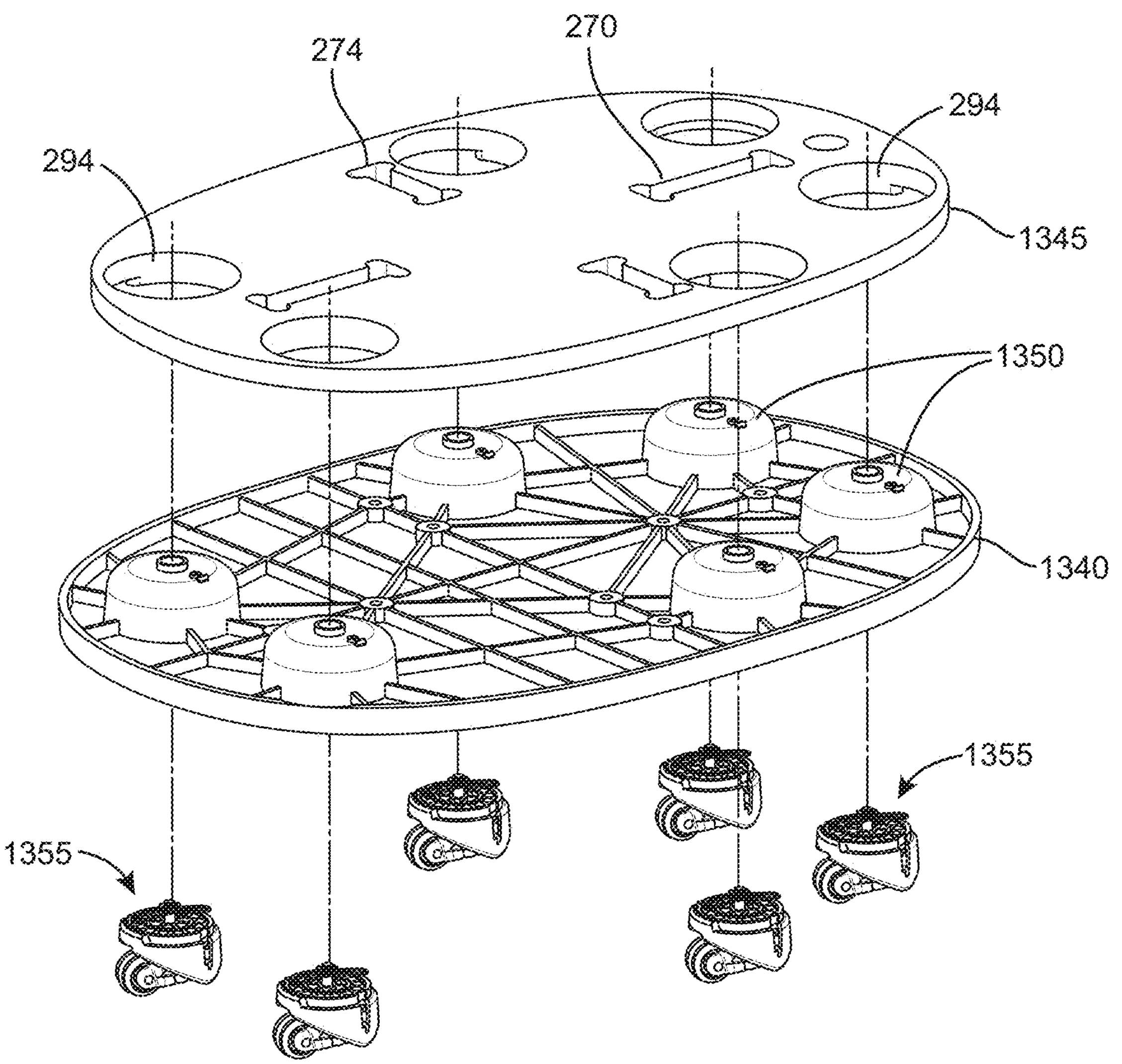
FIG. 20 is a top exploded view of the platform of FIG. 18.
Figure 21:
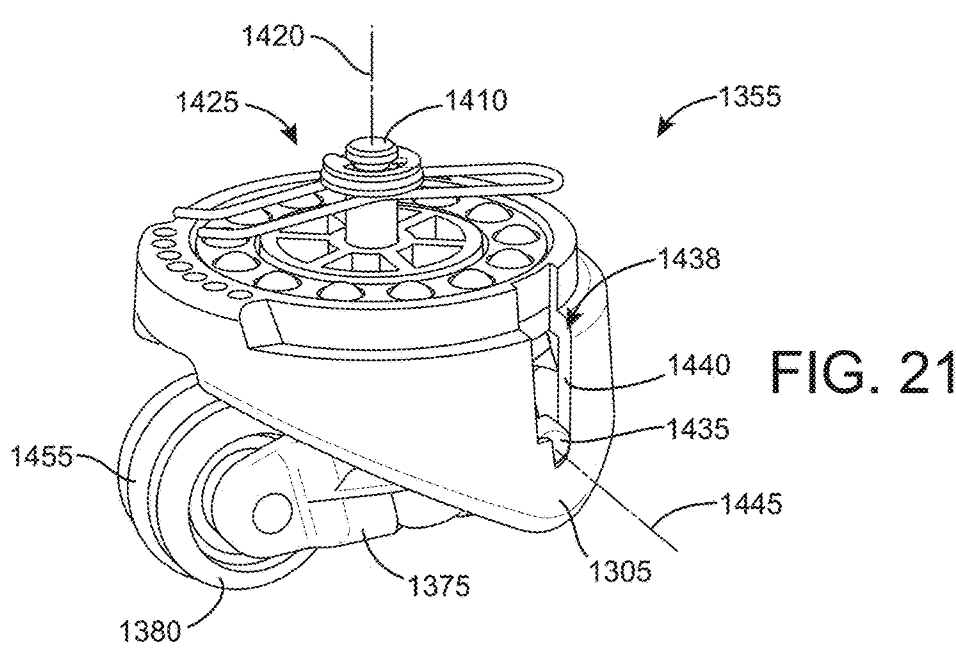
FIG. 21 is a perspective view of a caster wheel assembly of the platform of FIG. 18.
Figure 22:
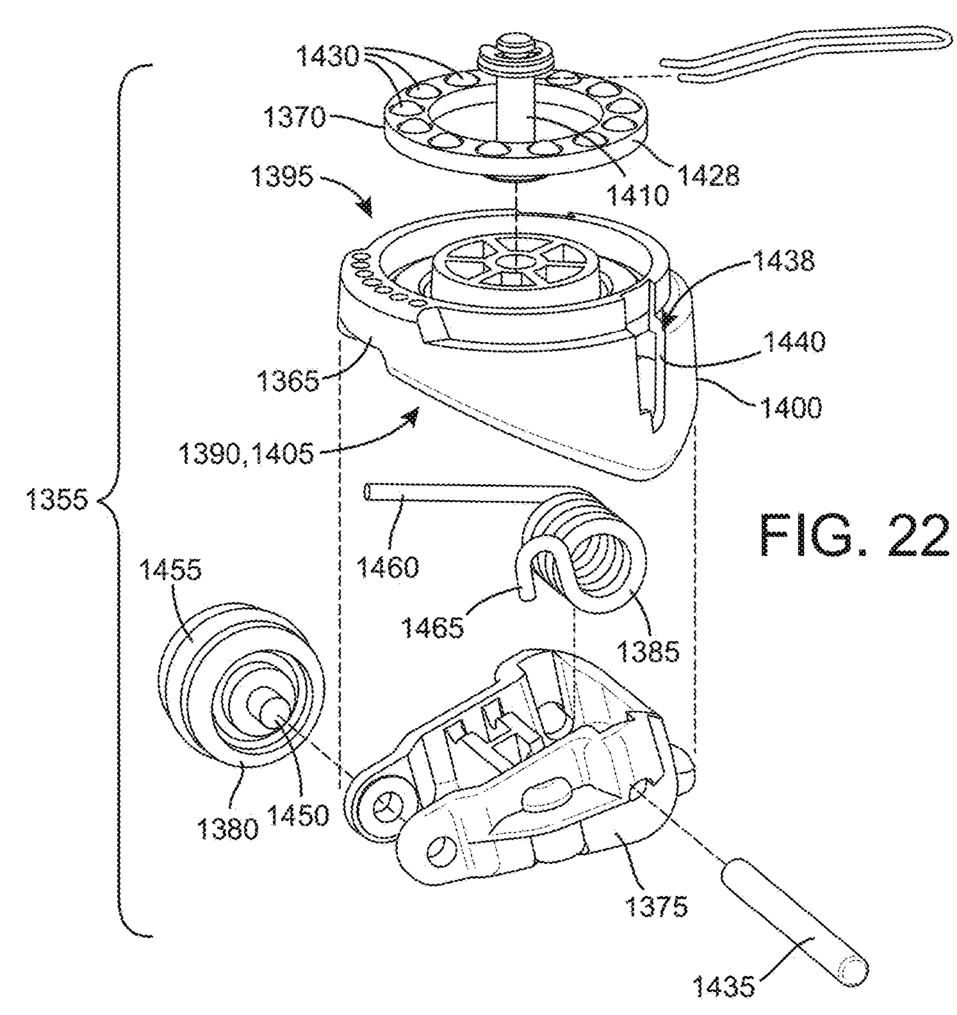
FIG. 22 is an exploded view of the caster wheel assembly of FIG. 21.
Figure 23:
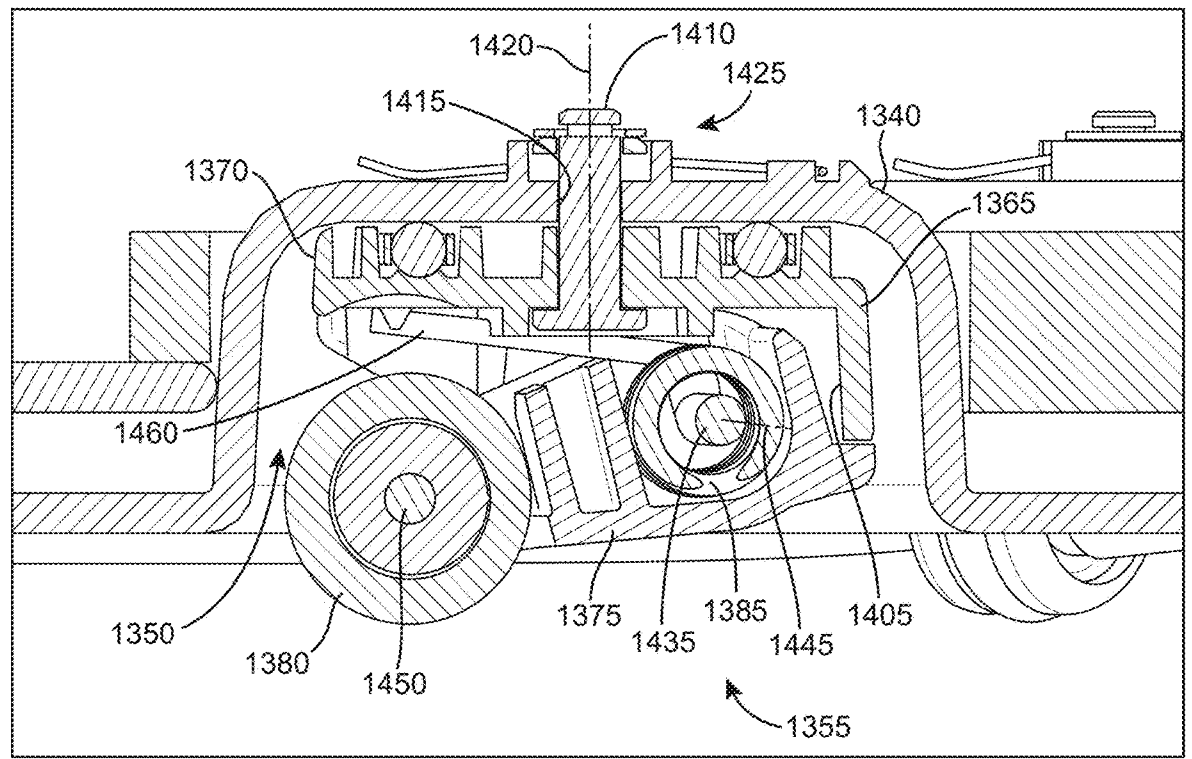
FIG. 23 is a cross-sectional view of the caster wheel assembly of FIG. 21 coupled to the chair of FIG. 1, the caster wheel assembly in an extended position.
Figure 24:
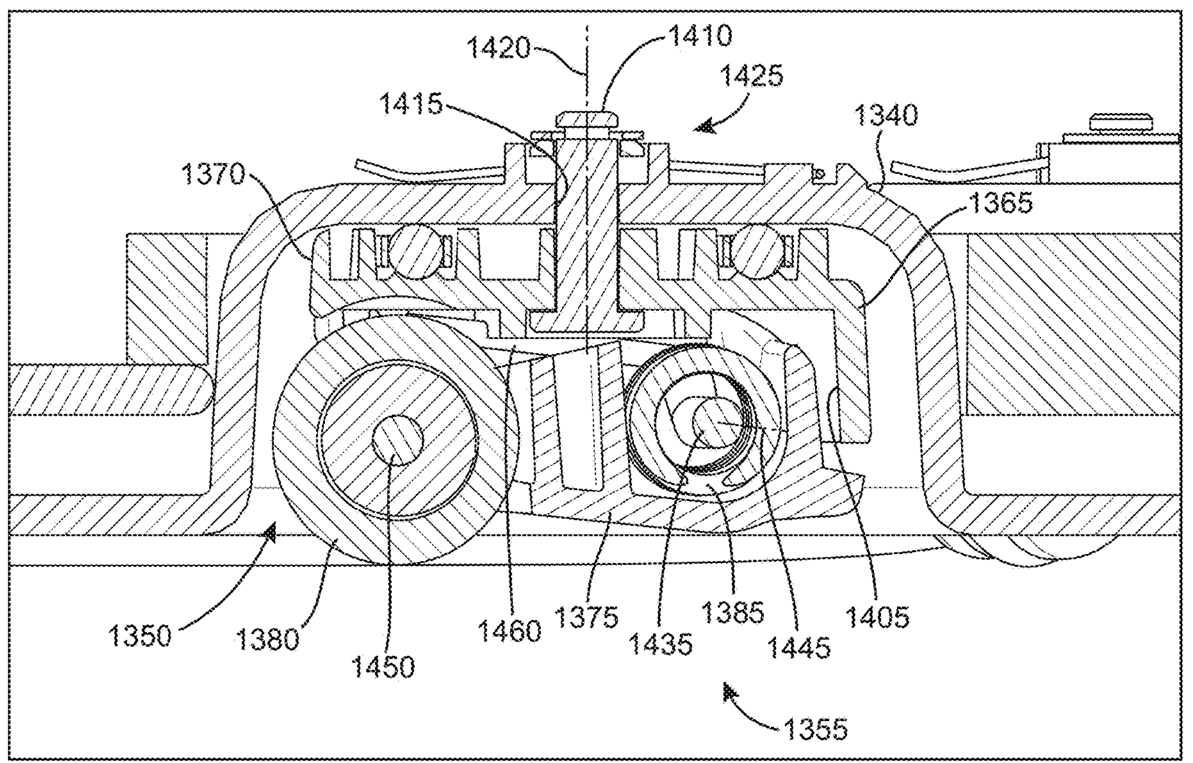
FIG. 24 is a cross-sectional view of the caster wheel assembly of FIG. 21 coupled to the chair of FIG. 1, the caster wheel assembly in a retracted position.

With reference to FIGS. 19 and 20, the base platform 1330 includes a lower portion 1340 (e.g., a caster assembly support) and an upper portion 1345. The lower portion 1340 includes a plurality of recesses 1350 that each receives a caster wheel assembly 1335. In the illustrated embodiment, the lower portion 1340 includes six recesses 1350 spaced apart within an area of the lower portion 1340 that each receive a caster wheel assembly 1335. Specifically, the base platform 1330 includes two recesses 1350 adjacent the front of the chair 10 and four recesses 1350 adjacent the rear of the chair 10. In other embodiments, the recesses 1350 may be positioned differently around the base platform 1330. In some embodiments, not every recess 1350 receives a caster wheel assembly 1335. In further embodiments, the lower portion 1340 may not include recesses 1350 for the caster wheel assemblies 1335. In such an embodiment, the chair 10 may include a skirt or other feature to hide the caster wheel assemblies 1335.

In the illustrated embodiment, a lip 1355 extends substantially around the perimeter of the lower portion 1340 of the base platform 1330. The lip 1355 provides a contact point between the chair 10 and a surface the chair is supported on when a user is seated in the chair 10. As such, the weight of the user is distributed about the lip 1355 when a user is seated in the chair 10. The lip 1355 also defines a tapered portion 1360 near the rear of chair 10 where the lip 1355 does not extend. The tapered portion 1360 provides a smooth and clear surface that allows a user to lift and slide the chair 10 across a surface with minimal interference. In some embodiments, the base platform 1330 does not include the lip 1355. In such an embodiment, the weight of the user is distributed to a bottom surface of the lower portion 1340.

The upper portion 1345 is similar to the upper portion 266 discussed above. The upper portion 1345 includes the central slots 270 and the lateral slots 274 that receive the lower frame spine projections 278 and the lower frame body projections 282, respectively. The upper portion 1345 also includes a plurality of the wheel mounting apertures 294 discussed above. The top side of the recesses 1350 of the lower portion 1340 are received through respective apertures 284.

FIGS. 21-24 illustrate one of the caster wheel assemblies 1335. The other caster wheel assemblies 1335 are substantially the same as the illustrated caster wheel assembly 1335. In the illustrated embodiment, the caster wheel assembly 1335 includes a housing 1365, a bearing 1370, a pivot arm 1375 pivotably coupled to the housing 1365, a wheel 1380 supported by the pivot arm 1375, and a biasing member 1385. The housing 1365 is generally cylindrical and includes an open bottom end 1390, a generally closed top end 1395, a cylindrical side wall 1400 extending between the top and bottom ends 1390, 1395, and an interior 1405 defined within the cylindrical side wall 1400. The housing 1365 is rotatably coupled to the lower portion 1340 of the base platform 1330 with a rotation shaft 1410. The rotation shaft 1410 extends through an aperture 1415 (FIG. 23) in the lower portion 1340 of the base platform 1330 and defines a rotation axis 1420. A fastener 1425 (e.g., a nut and spring clip) is used to secure the housing 1365 within the recess 1350 of the base platform 1330.

The bearing 1370 is positioned between the top end 1390 of the housing 1365 and the inside of the recess 1350. In particular, the bearing 1370 sits within a recess or channel 1395 formed in the top end 1390 of the housing 1365. The bearing 1370 is an annular member that surrounds rotation shaft 1410 and the rotation axis 1420. The bearing 1370 has an outer diameter that is less than an outer diameter of the housing 1365. In the illustrated embodiment, the bearing 1370 is a roller bearing. The illustrated roller bearing 1370 includes a base 1428 and a plurality of ball bearings 1430 spaced circumferentially about the base 1428. The roller bearing 1370 allows for the housing 1365 and the caster assembly 1335 to rotate about the rotation axis 1420 relative to the lower portion 1340 of the base platform 1330. The roller bearing 1370 reduces friction between the housing 1365 and the lower portion 1340 during rotation. In other embodiments, the caster wheel assembly 1335 may additionally or alternatively include other types of bearings.

The pivot arm 1375 includes a first end and a second end opposite the first end. The pivot arm 1375 is pivotably coupled to the housing 1365 at the first end with a pivot rod 1435. Specifically, the cylindrical side wall 1400 of the housing 1365 includes a pivot arm seat 1438 that supports the pivot arm 1375. The pivot arm seat 1438 is defined by two elongated slots 1440 (only one shown) that receive the ends of the pivot rod 1435. As such, the pivot arm 1375 is pivotable relative to the housing 1365 about a pivot axis 1445 defined by the pivot rod 1435. Further, the pivot arm 1375 is coupled to the housing 1365 for rotation therewith about the rotation axis 1420. In the illustrated embodiment, the rotation axis 1420 is generally perpendicular to the pivot axis 1445. In other embodiments, the rotation axis 1420 and the pivot axis 1445 are oblique or not perpendicular relative to each other. The opposite end of the pivot arm 1375 receives an axle 1450 that supports the wheel 1380 for rotation along a surface.

Figure 25:
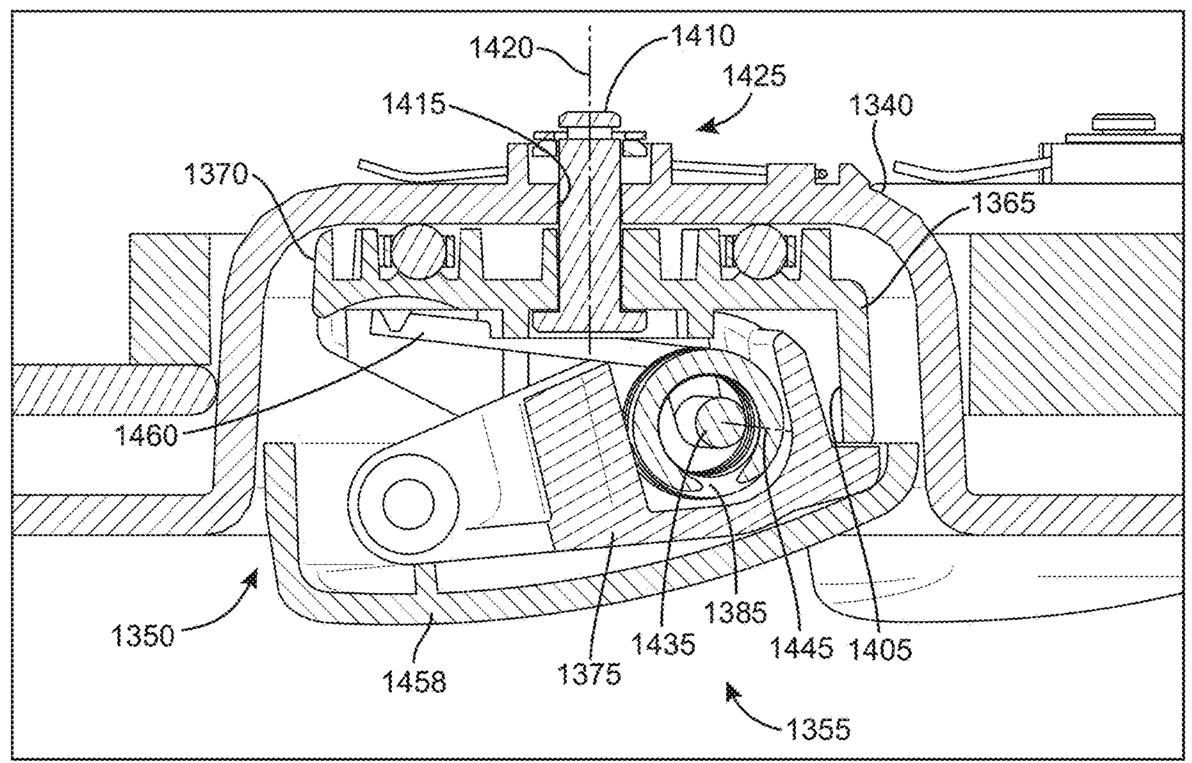
FIG. 25 is a cross-sectional view of a glide assembly according to another embodiment.

The wheel 1380 is coupled to the second end of the pivot arm 1375 opposite from the pivot rod 1435 and the pivot axis 1445. The illustrated wheel 1380 includes a middle portion 1455 that contacts the surface. The middle portion 1455 may be a rubber or similar material to improve grip on the surface. In some embodiments, the middle portion 1455 may be omitted so that the rest of the wheel 1380 contacts the surface. With reference to FIG. 25, in other embodiments, a glide 1458 may be coupled to the end of the pivot arms 1375 instead of the wheels 1380. Each glide 1458 can pivot between the extended position and the retracted position with the pivot arm 1375. Each glide 1458 may be formed of a relatively low friction material. In such embodiments, the low friction material of each glide 1458 would contact a surface to allow a user to easily move (e.g., slide) the chair 10 across a surface.

The biasing member 1385 is supported within the interior 1405 of the housing 1365. In the illustrated embodiment, the biasing member 1385 is a coil torsion spring. In other embodiments, the biasing member 1385 may be a leaf spring, a compression spring, or the like. The biasing member 1385 is supported on the pivot rod 1435 with a first end portion 1460 that engages a portion of the housing 1365 and a second end portion 1465 that engages a portion of the pivot arm 1375. The biasing member 1385 biases the pivot arm 1375, and thus the wheel 1380, away from the housing 1365 to an extended position. As will be discussed in more detail below, the caster wheel assemblies 1335 are moveable between an extended position (FIG. 23), in which the wheels 1380 support the chair 10 on a surface, and a retracted position (FIG. 24), in which the lower portion 1340 of the base platform 1330 supports the chair 10 on the surface.

Generally, when a user is not seated in the chair 10, the caster wheel assemblies 1335 are in the extended position. In the extended position, since the weight of the user is not acting on the biasing members 1385, the biasing members 1385 bias the pivot arms 1375 and the wheels 1380 out of the housing 1365 and into engagement with the surface the chair 10 is supported on. Due to the weight of the user not being in the chair 10, the wheels 1380 engage and support a portion of the weight of the chair 10 on the surface. The wheels 1380 also support, or lift, the base platform 1330 apart from the surface. As such, when in the extended position, a user can easily move the chair 10 to a new position on the surface with the wheels 1380. For example, a user may pull on the handle 1078 to move the chair 10 along the surface. As the user pulls on the handle 1078, the chair 10 may tilt slightly rearwardly (i.e., toward the handle 1078 and the user). The tapered portion 1360 of the lower portion 1340 provides clearance for the base 14 of the chair 10 so the lip 1355 (if present) is moved out of the way of travel and the chair 10 does not rub on the surface. The user may then pull the chair 10 across the surface, with the rear end leading, to a new position. Meanwhile, the caster wheel assemblies 1335 remain in the extended position to engage and roll across the surface. It should be noted, although the caster wheel assemblies 1335 support a majority of the weight of the chair 10 in the extended position, other portions of the base platform 1330 (e.g., lower portion 1340 or lip 1355) may still be in contact with the surface.

When a user sits in the chair 10, the force of their weight and the reaction force from the surface act against the biasing forces of the biasing members 1385 and force the caster wheel assemblies 1335 to the retracted position. In the retracted position, each caster wheel assembly 1335 pivots about the pivot rod 1435 against the biasing member 1385 and into the respective recess 1350 of the base platform 1330. With the wheels 1380 in the retracted position, the lip 1355 or the bottom surface of the lower portion 1340 of the base platform 1330 engages the surface to support the chair 10 and the user. When in the retracted position, although the wheels 1380 may remain in contact with the surface, a majority of the weight of the chair and user is supported by the lower portion 1340 of the base platform 1330. When the caster wheel assemblies 1335 are in the retracted position and a user is seated in the chair 10, the chair 10 is inhibited from moving across the surface.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. An article of furniture comprising:

a foam base including a foam seat, a foam back extending from the foam seat, and a slot extending along the foam seat;

a rigid frame including a frame seat, a frame back, and a projection, the frame seat configured to engage the foam seat, the frame back configured to engage the foam back, the projection configured to be received in the slot; and a padded support including a padded seat and a padded back, the padded support disposed on a side of the rigid frame opposite the foam base, the padded seat configured to engage the frame seat, the padded back configured to engage the frame back.

2. The article of furniture of claim 1, further comprising a cover surrounding the foam base, the rigid frame, and the padded support.

3. The article of furniture of claim 1, wherein the slot extends along the foam seat and the foam back, and wherein the projection extends along the slot.

4. The article of furniture of claim 1, wherein the slot is a first slot extending along a first plane, and wherein the foam base also includes a second slot extending along a second plane that intersects the first plane.

5. The article of furniture of claim 4, wherein the projection includes a planar spine and a planar body, the planar spine is received in the first slot, and the planar body is received in the second slot.

6. The article of furniture of claim 1, further comprising a base platform coupled to the rigid frame and a plurality of wheels coupled to the base platform.

7. An article of furniture comprising:

a base;

a seat on a top side of the base;

a base platform coupled to a bottom side of the base opposite the top side; and a plurality of caster assemblies coupled to the base platform, the plurality of caster assemblies pivotable relative to the base platform between an extended position, in which the plurality of caster assemblies extends outwardly from the base platform and supports the article of furniture on a surface and the base platform is spaced apart from the surface, and a retracted position, in which the plurality of caster assemblies is retracted into the base platform and at least a portion of the base platform contacts the surface;

wherein the base platform includes a raised portion extending from the base platform adjacent a perimeter of the base platform, wherein the raised portion contacts the surface when the plurality of the caster assemblies is in the retracted position.

8. The article of furniture of claim 7, wherein the base platform includes a plurality of recesses, each recess configured to receive one of the plurality of caster assemblies.

9. The article of furniture of claim 7, wherein each caster assembly includes a wheel configured to engage the surface.

10. The article of furniture of claim 7, wherein the base platform covers a substantial portion of the bottom side of the base.

11. The article of furniture of claim 7, wherein the raised portion is a lip extending around at least part of the perimeter of the base platform, and wherein the lip contacts the surface when the plurality of caster assemblies is in the retracted position.

12. The article of furniture of claim 7, wherein each caster assembly is pivotable between the extended position and the retracted position about a first axis, and wherein each caster assembly is also rotatable relative to the base platform about a second axis that is perpendicular to the first axis.

13. The article of furniture of claim 7, wherein the plurality of caster assemblies is biased to the extended position.

14. The article of furniture of claim 7, wherein the plurality of caster assemblies is positioned adjacent and spaced apart around a perimeter of the base platform.

15. A caster assembly for an article of furniture, the caster assembly comprising:

a rotation shaft configured to be coupled to the article of furniture;

a housing rotatably coupled to the article of furniture by the rotation shaft about a rotation axis;

a pivot arm having a first end and a second end opposite the first end, the first end pivotably coupled to the housing about a pivot axis:

a wheel rotatably coupled to the second end of the pivot arm:

a biasing member disposed between the housing and the pivot arm to bias the pivot arm away from the housing to an extended position; and a bearing positioned between the housing and the article of furniture, the bearing being an annular member surrounding the rotation shaft, the bearing including a first side in contact with the housing and a second side opposite the first side and configured to contact the article of furniture, the bearing configured to facilitate rotation of the housing relative to the article of furniture.

16. The caster assembly of claim 15, wherein the biasing member is a coil torsion spring.

17. The caster assembly of claim 15, wherein the rotation axis is perpendicular to the pivot axis.

18. The caster assembly of claim 15, wherein the housing includes an interior, and wherein the pivot arm is at least partially disposed within the interior.

19. The caster assembly of claim 18, wherein the pivot arm is moveable from the extended position, in which the wheel is biased at least partially out of the interior of the housing, to a retracted position, in which the wheel is disposed within the interior of the housing.

20. The caster assembly of claim 15, wherein the bearing is a roller bearing including a plurality of ball bearings.

* * * * *